(12) United States Patent
Tang et al.

(10) Patent No.: US 9,664,878 B2
(45) Date of Patent: May 30, 2017

(54) OPTICAL IMAGING LENS

(71) Applicant: GENIUS ELECTRONIC OPTICAL CO., LTD., Taichung (TW)

(72) Inventors: Tzu-Chien Tang, Taichung (TW); Pei Chi Wang, Taichung (TW)

(73) Assignee: GeniuS Electronic Optical Co., Ltd., Taichung (TW)

( * ) Notice: Subject to any disclaimer, the term of this patent is extended or adjusted under 35 U.S.C. 154(b) by 26 days.

(21) Appl. No.: 14/987,442

(22) Filed: Jan. 4, 2016

(65) Prior Publication Data

US 2017/0038556 A1 Feb. 9, 2017

(30) Foreign Application Priority Data

Aug. 4, 2015 (TW) .............................. 104125250 A

(51) Int. Cl.
*G02B 3/02* (2006.01)
*G02B 9/34* (2006.01)
*G02B 13/18* (2006.01)

(52) U.S. Cl.
CPC ............... *G02B 9/34* (2013.01); *G02B 13/18* (2013.01)

(58) Field of Classification Search
CPC ........................................................ G02B 9/34
USPC ........................................................ 359/715
See application file for complete search history.

(56) References Cited

U.S. PATENT DOCUMENTS

| | | | |
|---|---|---|---|
| 8,358,475 B2 | 1/2013 | Tsai et al. | |
| 8,411,377 B2 | 4/2013 | Tsai et al. | |
| 8,503,112 B2 | 8/2013 | Hsu et al. | |
| 2011/0058262 A1 | 3/2011 | Chen et al. | |
| 2013/0070347 A1* | 3/2013 | Tang ..................... | G02B 13/004 359/715 |
| 2015/0009581 A1 | 1/2015 | Chen | |

\* cited by examiner

*Primary Examiner* — James Jones
(74) *Attorney, Agent, or Firm* — Baker & McKenzie LLP

(57) ABSTRACT

Present embodiments provide for an optical imaging lens. The optical imaging lens may comprise four lens elements positioned sequentially from an object side to an image side. By controlling the convex or concave shape of the surfaces of the lens elements and designing parameters to satisfy at least three inequalities, the length of the optical imaging lens may be shortened while maintaining improved optical characteristics.

20 Claims, 28 Drawing Sheets

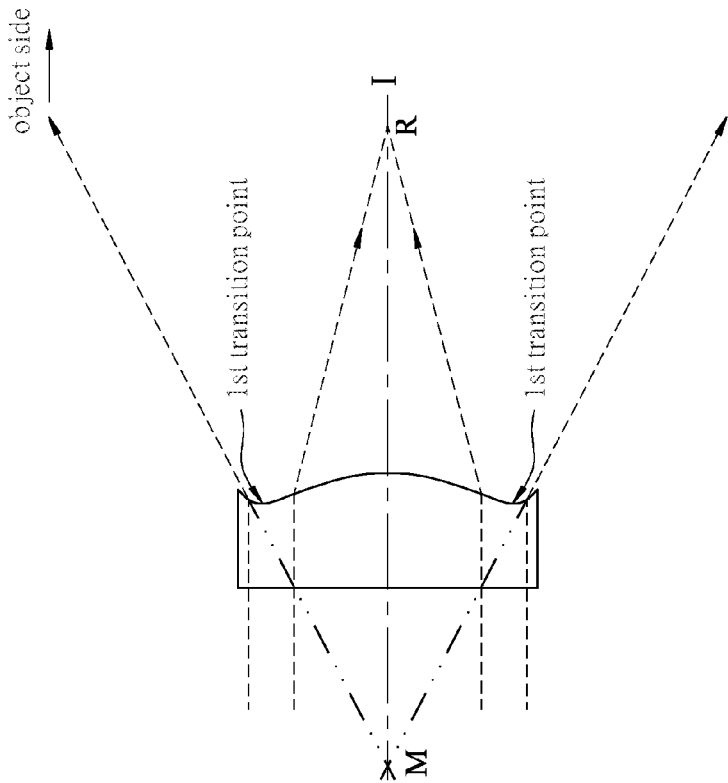
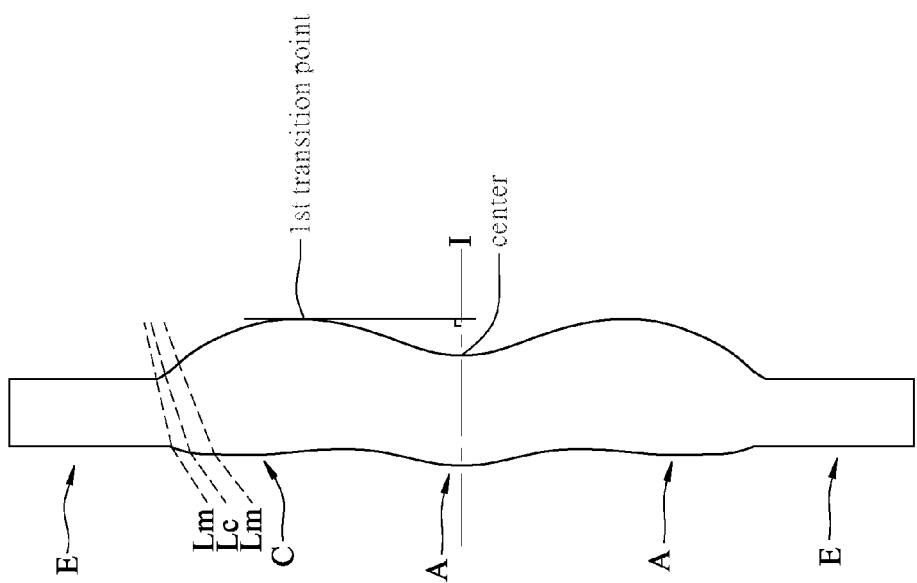
FIG. 1
FIG. 2

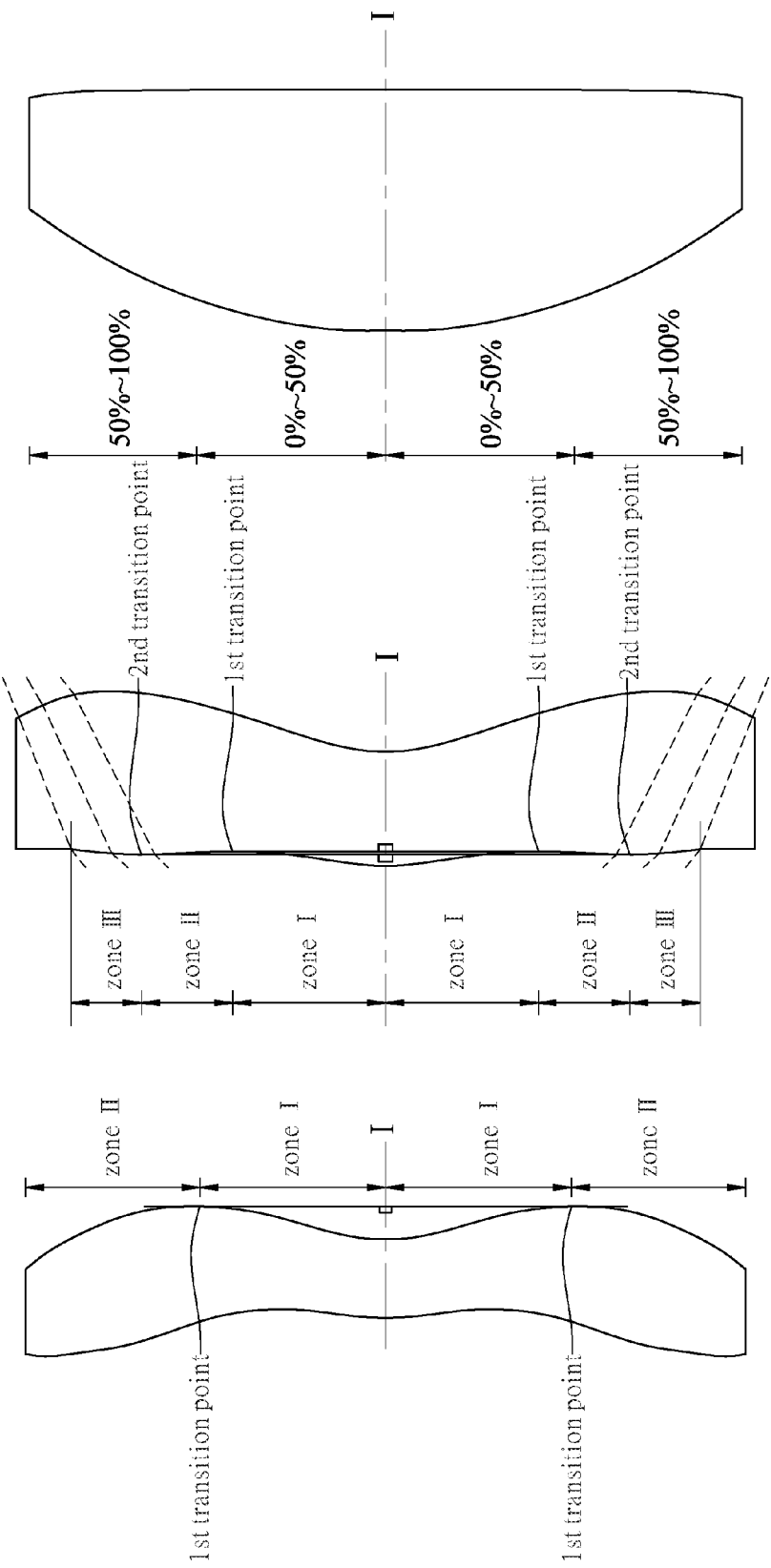

1st embodiment

EFL=2.295mm, HFOV=37.999deg.,
Fno=2.391, System length=3.352mm

| Lens | Surface | Radius (mm) | Thickness (mm) | Refractive index | Abbe number | Focus (mm) |
|---|---|---|---|---|---|---|
| Object | | 1.00E+18 | 10000 | | | |
| 1st lens element 3 | Object-side surface 31 | 1.459268011 | 0.325619 | 1.545931 | 56.11379 | 2.89587 |
| | Image-side surface 32 | 17.4662351 | 0.00557 | | | |
| Aperture stop 2 | | 1.00E+18 | 0.438875 | | | |
| 2nd lens lement 4 | Object-side surface 41 | -12.61268455 | 0.222222 | 1.611386 | 26.65149 | -4.12041 |
| | Image-side surface 42 | 3.168947385 | 0.068082 | | | |
| 3rd lens element 5 | Object-side surface 51 | -3.792499575 | 0.823075 | 1.545931 | 56.11379 | 1.15171 |
| | Image-side surface 52 | -0.580674206 | 0.066129 | | | |
| 4th lens element 6 | Object-side surface 61 | 1.435855018 | 0.3 | 1.545931 | 56.11379 | -1.49679 |
| | Image-side surface 62 | 0.482349022 | 0.45 | | | |
| IR cut Filter 9 | Object-side surface 91 | 1.00E+18 | 0.21 | | | |
| | Image-side surface 92 | 1.00E+18 | 0.442853 | | | |
| | Image plane 100 | 1.00E+18 | 0.004955 | | | |

FIG. 8

1st embodiment

| Surface | K | a4 | a6 | a8 | a10 | a12 | a14 | a16 | a18 | a20 |
|---|---|---|---|---|---|---|---|---|---|---|
| 31 | -2.036540 | 0.002464 | -0.16015 | -0.15801 | -1.43529 | 0 | 0 | 0 | 0 | 0 |
| 32 | 8.22874E-11 | -0.15783 | -0.66376 | 1.121272 | -2.77295 | 0 | 0 | 0 | 0 | 0 |
| 41 | -4.10639E-10 | -0.88058 | 0.271913 | -3.58164 | 6.28753 | 0 | 0 | 0 | 0 | 0 |
| 42 | -6.07233E-09 | -0.40335 | -0.0785 | -0.07149 | 0.76462 | -0.70816 | 0 | 0 | 0 | 0 |
| 51 | 1.478866 | 0.354479 | -0.82812 | 1.819242 | -0.6771 | -3.41465 | 5.213369 | -2.447492 | 0 | 0 |
| 52 | -0.97935 | 1.203584 | -4.8919 | 15.80492 | -35.0585 | 51.26897 | -44.1084 | 19.72705 | -3.48996 | 0 |
| 61 | 0.018266 | -0.68944 | 0.346498 | 0.53868 | -1.40389 | 1.486094 | -0.87463 | 0.275571 | -0.03602 | -0.00022 |
| 62 | -3.82954 | -0.32156 | 0.328894 | -0.22358 | 0.08964 | -0.01754 | 0.000242 | 0.000273 | 0 | 0 |

FIG. 9

2nd embodiment

EFL=2.261mm, HFOV= 38.229deg.,
Fno=2.356, System length=3.393mm

| Lens | Surface | Radius (mm) | Thickness (mm) | Refractive index | Abbe number | Focus (mm) |
|---|---|---|---|---|---|---|
| Object | | 1.00E+18 | 1000 | | | |
| 1st lens element 3 | Object-side surface 31 | 1.405284876 | 0.374403 | 1.545931 | 56.11379 | 2.83062 |
| | Image-side surface 32 | 14.0483376 | 0.007803 | | | |
| Aperture stop 2 | | 1.00E+18 | 0.475413 | | | |
| 2nd lens element 4 | Object-side surface 41 | -4.660051741 | 0.244434 | 1.611386 | 26.65149 | -3.36186 |
| | Image-side surface 42 | 3.750540771 | 0.062907 | | | |
| 3rd lens element 5 | Object-side surface 51 | -4.118267581 | 0.808989 | 1.545931 | 56.11379 | 1.10073 |
| | Image-side surface 52 | -0.560779722 | 0.046416 | | | |
| 4th lens element 6 | Object-side surface 61 | 1.382744956 | 0.311752 | 1.545931 | 56.11379 | -1.52124 |
| | Image-side surface 62 | 0.477547758 | 0.45 | | | |
| IR cut Filter 9 | Object-side surface 91 | 1.00E+18 | 0.21 | | | |
| | Image-side surface 92 | 1.00E+18 | 0.401802 | | | |
| | Image plane 100 | 1.00E+18 | 0.006056 | | | |

FIG. 12

| Surface | K | a4 | a6 | a8 | a10 | a12 | a14 | a16 | a18 | a20 |
|---|---|---|---|---|---|---|---|---|---|---|
| 31 | -1.319872 | 0.004712 | -0.05271 | -0.24706 | -0.73547 | 0 | 0 | 0 | 0 | 0 |
| 32 | -2.4563E-10 | -0.11907 | -0.55939 | 0.969507 | -2.31202 | 0 | 0 | 0 | 0 | 0 |
| 41 | -5.74994E-09 | -0.84373 | 0.285088 | -3.13391 | 4.3302 | 0 | 0 | 0 | 0 | 0 |
| 42 | -8.61504E-09 | -0.32722 | -0.26197 | 0.780438 | -0.87083 | 0.419955 | 0 | 0 | 0 | 0 |
| 51 | 8.036025 | 0.335672 | -1.23523 | 2.66249 | -1.98689 | -0.79803 | 1.912973 | -0.778234 | 0 | 0 |
| 52 | -0.941441 | 1.23779 | -4.86132 | 14.123 | -27.3286 | 33.02795 | -21.8275 | 6.370355 | -0.35677 | 0 |
| 61 | 0.00862 | -0.65806 | 0.278462 | 0.573234 | -1.38221 | 1.430009 | -0.84035 | 0.269241 | -0.03668 | -0.00022 |
| 62 | -3.838273 | -0.29997 | 0.281132 | -0.17874 | 0.06501 | -0.01109 | -0.00017 | 0.000186 | 0 | 0 |

2nd embodiment

FIG. 13

3rd embodiment

EFL=2.318mm, HFOV=38.000deg.,
Fno=2.415, System length=3.372mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 1.403228231 | 0.381823 | 1.545931 | 56.11379 | 2.93425 |
| | Image-side surface 32 | 10.22708024 | 0.00429 | | | |
| Aperture stop 2 | | 1.00E+18 | 0.268067 | | | |
| 2nd lens element 4 | Object-side surface 41 | -23.53238477 | 0.326303 | 1.611386 | 26.65149 | -3.89755 |
| | Image-side surface 42 | 2.665343682 | 0.09008 | | | |
| 3rd lens element 5 | Object-side surface 51 | -5.625172484 | 0.789425 | 1.545931 | 56.11379 | 1.13595 |
| | Image-side surface 52 | -0.586251062 | 0.051336 | | | |
| 4th lens element 6 | Object-side surface 61 | 1.511590089 | 0.3 | 1.545931 | 56.11379 | -1.45994 |
| | Image-side surface 62 | 0.485286019 | 0.45 | | | |
| IR cut Filter 9 | Object-side surface 91 | 1.00E+18 | 0.21 | | | |
| | Image-side surface 92 | 1.00E+18 | 0.501515 | | | |
| | Image plane 100 | 1.00E+18 | 0.003429 | | | |

FIG. 16

| Surface | K | a4 | a6 | a8 | a10 | a12 | a14 | a16 | a18 | a20 |
|---|---|---|---|---|---|---|---|---|---|---|
| 31 | -1.503723 | 0.022924 | -0.22852 | 0.543301 | -2.49026 | 0 | 0 | 0 | 0 | 0 |
| 32 | 4.95981E-09 | -0.22714 | -0.73445 | 1.322018 | -3.40683 | 0 | 0 | 0 | 0 | 0 |
| 41 | 6.44894E-09 | -0.75989 | 0.083551 | -3.59623 | 6.55991 | 0 | 0 | 0 | 0 | 0 |
| 42 | 1.937431 | -0.25738 | -0.4648 | 1.388304 | -2.13405 | 1.337647 | 0 | 0 | 0 | 0 |
| 51 | 5.395504 | 0.343046 | -0.9482 | 2.489776 | -2.23272 | -1.79184 | 4.1679 | -1.895109 | 0 | 0 |
| 52 | -0.994859 | 1.263242 | -5.18997 | 16.47432 | -33.4963 | 40.34642 | -21.5311 | -1.257286 | 3.921148 | 0 |
| 61 | 0.110854 | -0.79266 | 0.622098 | 0.247923 | -1.5593 | 2.107823 | -1.39092 | 0.435835 | -0.04715 | -0.00029 |
| 62 | -4.095454 | -0.35332 | 0.414251 | -0.35254 | 0.18544 | -0.05255 | 0.005198 | 0.000299 | 0 | 0 |

3rd embodiment

4th embodiment

EFL=2.362mm, HFOV=37.992deg., Fno=2.461, System length=3.412mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 1.668168115 | 0.321594 | 1.545931 | 56.11379 | 3.41316 |
| | Image-side surface 32 | 14.84117558 | -0.00529 | | | |
| Aperture stop 2 | | 1.00E+18 | 0.182498 | | | |
| 2nd lens element 4 | Object-side surface 41 | 6.486402292 | 0.354413 | 1.611386 | 26.65149 | -4.28063 |
| | Image-side surface 42 | 1.826081016 | 0.121352 | | | |
| 3rd lens element 5 | Object-side surface 51 | -25.16204481 | 0.819424 | 1.545931 | 56.11379 | 1.30802 |
| | Image-side surface 52 | -0.702367729 | 0.333885 | | | |
| 4th lens element 6 | Object-side surface 61 | -45.54732384 | 0.3 | 1.545931 | 56.11379 | -1.61519 |
| | Image-side surface 62 | 0.901282287 | 0.45 | | | |
| IR cut Filter 9 | Object-side surface 91 | 1.00E+18 | 0.21 | | | |
| | Image-side surface 92 | 1.00E+18 | 0.324418 | | | |
| | Image plane 100 | 1.00E+18 | -0.01229 | | | |

4th embodiment

| Surface | K | a4 | a6 | a8 | a10 | a12 | a14 | a16 | a18 | a20 |
|---|---|---|---|---|---|---|---|---|---|---|
| 31 | -1.88134 | 0.050934 | -0.70235 | 2.863289 | -7.09452 | 0 | 0 | 0 | 0 | 0 |
| 32 | -1.5645E-09 | -0.32553 | -0.74351 | 1.915005 | -5.41397 | 0 | 0 | 0 | 0 | 0 |
| 41 | -1.01203E-09 | -0.7936 | -0.52027 | -0.28645 | 0.54156 | 0 | 0 | 0 | 0 | 0 |
| 42 | 0.591836 | -0.3503 | -0.12947 | 0.072881 | 0.28555 | -0.47115 | 0 | 0 | 0 | 0 |
| 51 | 300 | 0.205693 | 0.14605 | -0.94031 | 2.28831 | -3.44779 | 3.16434 | -1.383278 | 0 | 0 |
| 52 | -0.921043 | 0.500936 | -0.82825 | 0.77459 | 2.41471 | -8.68386 | 13.1737 | -9.56833 | 2.60925 | 0 |
| 61 | 300 | 0.060828 | -0.87862 | 1.794088 | -2.03537 | 1.299063 | -0.44303 | 0.067846 | -0.00222 | -9.9E-06 |
| 62 | -4.238039 | -0.23307 | 0.155207 | -0.06236 | -0.0006 | 0.00728 | -0.00162 | 8.89E-05 | 0 | 0 |

FIG. 21

5th embodiment

EFL=2.360mm, HFOV=37.998deg., Fno=2.459, System length=3.407mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 1.648619724 | 0.395298 | 1.545931 | 56.11379 | 2.96111 |
| | Image-side surface 32 | -76.08836205 | -0.00656 | | | |
| Aperture stop 2 | | 1.00E+18 | 0.297937 | | | |
| 2nd lens element 4 | Object-side surface 41 | 69.79534488 | 0.22 | 1.611386 | 26.65149 | -3.88746 |
| | Image-side surface 42 | 2.295722373 | 0.100432 | | | |
| 3rd lens element 5 | Object-side surface 51 | -6.212713786 | 0.824013 | 1.545931 | 56.11379 | 1.25419 |
| | Image-side surface 52 | -0.645618152 | 0.294866 | | | |
| 4th lens element 6 | Object-side surface 61 | -63.33928565 | 0.3 | 1.545931 | 56.11379 | -1.51068 |
| | Image-side surface 62 | 0.837002419 | 0.45 | | | |
| IR cut Filter 9 | Object-side surface 91 | 1.00E+18 | 0.21 | | | |
| | Image-side surface 92 | 1.00E+18 | 0.321774 | | | |
| | Image plane 100 | 1.00E+18 | -0.00776 | | | |

FIG. 24

5th embodiment

| Surface | K | a4 | a6 | a8 | a10 | a12 | a14 | a16 | a18 | a20 |
|---|---|---|---|---|---|---|---|---|---|---|
| 31 | -1.900888 | -0.01144 | -0.18408 | 0.219579 | -1.47993 | 0 | 0 | 0 | 0 | 0 |
| 32 | 7.82138E-10 | -0.23588 | -0.50749 | 1.255833 | -3.19498 | 0 | 0 | 0 | 0 | 0 |
| 41 | -1.97219E-09 | -0.86158 | -0.51121 | 0.034085 | 1.8072 | 0 | 0 | 0 | 0 | 0 |
| 42 | 0.245717 | -0.38211 | -0.35462 | 1.429433 | -1.99213 | 0.964952 | 0 | 0 | 0 | 0 |
| 51 | 2.746832 | 0.259529 | -0.0997 | -0.22063 | 1.46822 | -3.59078 | 4.065932 | -1.842214 | 0 | 0 |
| 52 | -0.922241 | 0.601794 | -1.27965 | 2.222279 | -1.51115 | -1.94108 | 6.873876 | -6.863628 | 2.29241 | 0 |
| 61 | -300 | 0.069219 | -0.79733 | 1.612808 | -1.81108 | 1.205792 | -0.45615 | 0.081552 | -0.00359 | -1.7E-05 |
| 62 | -5.050147 | -0.17743 | 0.083574 | -0.0047 | -0.02406 | 0.012266 | -0.0022 | 8.65E-05 | 0 | 0 |

FIG. 25

6th embodiment

EFL=2.362mm, HFOV= 37.997deg.,
Fno=2.461, System length=3.411mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 1.492978614 | 0.348898 | 1.545931 | 56.11379 | 3.21297 |
| | Image-side surface 32 | 9.202641843 | 0.00059 | | | |
| Aperture stop 2 | | 1.00E+18 | 0.176328 | | | |
| 2nd lens element 4 | Object-side surface 41 | 3.711476489 | 0.308837 | 1.611386 | 26.65149 | -5.64314 |
| | Image-side surface 42 | 1.731568796 | 0.115087 | | | |
| 3rd lens element 5 | Object-side surface 51 | -18.74781515 | 0.86705 | 1.545931 | 56.11379 | 1.25912 |
| | Image-side surface 52 | -0.673907673 | 0.032818 | | | |
| 4th lens element 6 | Object-side surface 61 | -42.10085535 | 0.589727 | 1.545931 | 56.11379 | -1.39968 |
| | Image-side surface 62 | 0.782103875 | 0.45 | | | |
| IR cut Filter 9 | Object-side surface 91 | 1.00E+18 | 0.21 | | | |
| | Image-side surface 92 | 1.00E+18 | 0.311748 | | | |
| | Image plane 100 | 1.00E+18 | -0.01108 | | | |

FIG. 28

6th embodiment

| Surface | K | a4 | a6 | a8 | a10 | a12 | a14 | a16 | a18 | a20 |
|---|---|---|---|---|---|---|---|---|---|---|
| 31 | -1.605514 | 0.056549 | -0.57279 | 2.135563 | -5.4076 | 0 | 0 | 0 | 0 | 0 |
| 32 | -3.91196E-09 | -0.3254 | -0.70644 | 1.67155 | -4.56775 | 0 | 0 | 0 | 0 | 0 |
| 41 | 2.07494E-09 | -0.73226 | -0.9346 | 0.431844 | 0.54241 | 0 | 0 | 0 | 0 | 0 |
| 42 | -0.019361 | -0.19184 | -0.63245 | 1.109783 | -1.50288 | 0.694797 | 0 | 0 | 0 | 0 |
| 51 | -300 | 0.35091 | 0.205808 | -1.72389 | 4.20427 | -7.89985 | 9.187155 | -4.676657 | 0 | 0 |
| 52 | -0.938953 | 0.610164 | -1.38912 | 2.996076 | -1.43218 | -7.63467 | 20.42966 | -20.35314 | 7.260732 | 0 |
| 61 | 229.079118 | -0.27645 | -0.07933 | 0.882981 | -1.78131 | 1.702795 | -0.81047 | 0.167818 | -0.00796 | -4.1E-05 |
| 62 | -5.897622 | -0.20309 | 0.169876 | -0.10865 | 0.03675 | -0.00616 | 0.000319 | 2.93E-05 | 0 | 0 |

FIG. 29

7th embodiment

EFL=2.316mm, HFOV= 38.000deg.,
Fno=2.413, System length=3.396mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 1.49584145 | 0.325625 | 1.545931 | 56.11379 | 2.98579 |
| | Image-side surface 32 | 150 | -0.00385 | | | |
| Aperture stop 2 | | 1.00E+18 | 0.449503 | 1.611386 | 26.65149 | -4.14135 |
| 2nd lens element 4 | Object-side surface 41 | -150 | 0.22 | | | |
| | Image-side surface 42 | 2.576872941 | 0.104785 | 1.545931 | 56.11379 | 1.18267 |
| 3rd lens element 5 | Object-side surface 51 | -4.021682239 | 0.8118 | | | |
| | Image-side surface 52 | -0.595998089 | 0.125059 | 1.545931 | 56.11379 | -1.51766 |
| 4th lens element 6 | Object-side surface 61 | 1.744326074 | 0.3 | | | |
| | Image-side surface 62 | 0.527608121 | 0.45 | | | |
| IR cut Filter 9 | Object-side surface 91 | 1.00E+18 | 0.21 | | | |
| | Image-side surface 92 | 1.00E+18 | 0.402644 | | | |
| | Image plane 100 | 1.00E+18 | 0.003429 | | | |

FIG. 32

7th embodiment

| Surface | K | a4 | a6 | a8 | a10 | a12 | a14 | a16 | a18 | a20 |
|---|---|---|---|---|---|---|---|---|---|---|
| 31 | -2.334680 | -0.00718 | -0.15867 | -0.26795 | -1.34905 | 0 | 0 | 0 | 0 | 0 |
| 32 | 1.40758E-09 | -0.177 | -0.64508 | 1.147031 | -2.85281 | 0 | 0 | 0 | 0 | 0 |
| 41 | -1.5531E-09 | -0.83657 | 0.178054 | -2.56143 | 4.47109 | 0 | 0 | 0 | 0 | 0 |
| 42 | 2.756701 | -0.44473 | 0.108748 | -0.2952 | 0.7522 | -0.68213 | 0 | 0 | 0 | 0 |
| 51 | 3.345465 | 0.266467 | -0.325 | 0.432006 | 0.84634 | -3.41328 | 4.035983 | -1.826715 | 0 | 0 |
| 52 | -0.954365 | 0.995433 | -3.33374 | 8.797932 | -15.4089 | 16.2631 | -7.16288 | -1.015709 | 1.260031 | 0 |
| 61 | 0.099459 | -0.46955 | 0.117527 | 0.362372 | -0.63473 | 0.559914 | -0.30728 | 0.099496 | -0.01483 | -8.1E-05 |
| 62 | -3.891055 | -0.24601 | 0.18364 | -0.09065 | 0.02165 | -0.00013 | -0.00109 | 0.000116 | 0 | 0 |

FIG. 33

8th embodiment

EFL=2.337mm, HFOV= 37.998deg.,
Fno=2.250, System length=4.112mm

| Lens | Surface | Radius (mm) | Thickness (mm) | Refractive index | Abbe Fno | Focus (mm) |
|---|---|---|---|---|---|---|
| Object | | 1.00E+18 | 10000 | | | |
| 1st lens element 3 | Object-side surface 31 | 2.967877938 | 0.3 | 1.545931 | 56.11379 | 3.52799 |
| | Image-side surface 32 | -5.290836566 | -0.02536 | | | |
| Aperture stop 2 | | 1.00E+18 | 0.473846 | | | |
| 2nd lens element 4 | Object-side surface 41 | -6.632224578 | 0.22 | 1.611386 | 26.65149 | -4.70716 |
| | Image-side surface 42 | 5.147938862 | 0.039286 | | | |
| 3rd lens element 5 | Object-side surface 51 | -38.1135225 | 1.553305 | 1.545931 | 56.11379 | 1.28606 |
| | Image-side surface 52 | -0.699319928 | 0.03 | | | |
| 4th lens element 6 | Object-side surface 61 | 1.390574997 | 0.395669 | 1.545931 | 56.11379 | -1.7039 |
| | Image-side surface 62 | 0.501362343 | 0.6 | | | |
| IR cut Filter 9 | Object-side surface 91 | 1.00E+18 | 0.21 | | | |
| | Image-side surface 92 | 1.00E+18 | 0.316206 | | | |
| | Image plane 100 | 1.00E+18 | 0.025073 | | | |

FIG. 36

8th embodiment

| Surface | K | a4 | a6 | a8 | a10 | a12 | a14 | a16 | a18 | a20 |
|---|---|---|---|---|---|---|---|---|---|---|
| 31 | -8.300533 | -0.15582 | 3.575807 | -65.0913 | 649.44 | -3972.29 | 15042.66 | -34404.17 | 43440.21 | -23201.8 |
| 32 | -0.028544 | -0.03949 | -3.16964 | 43.44553 | -350.483 | 1556.133 | -3596.74 | 3370.199 | 0 | 0 |
| 41 | 8.55234E-10 | -0.58379 | 2.163744 | -18.0934 | 85.2493 | -244.973 | 383.2823 | -250.8929 | 0 | 0 |
| 42 | 18.597028 | -0.32222 | 1.142714 | -4.08332 | 8.85019 | -12.332 | 10.02005 | -3.605952 | 0 | 0 |
| 51 | 0.515819 | 0.07646 | 0.595124 | -2.14209 | 5.34937 | -10.8347 | 15.65842 | -14.1279 | 6.997186 | -1.44469 |
| 52 | -0.850626 | 0.686332 | -1.52526 | 2.782163 | -3.30201 | 2.407481 | -0.95392 | 0.158924 | 0 | 0 |
| 61 | 0.000543 | -0.44042 | 0.125291 | 0.268134 | -0.72898 | 0.881706 | -0.61784 | 0.236217 | -0.03792 | -0.00023 |
| 62 | -3.008224 | -0.15673 | 0.088548 | -0.03074 | -0.00205 | 0.004647 | -0.00128 | 9.59E-05 | 0 | 0 |

FIG. 37

|  | 1st | 2nd | 3rd | 4th | 5th | 6th | 7th | 8th |
|---|---|---|---|---|---|---|---|---|
| T1 | 0.33 | 0.37 | 0.38 | 0.32 | 0.40 | 0.35 | 0.33 | 0.30 |
| G12 | 0.44 | 0.48 | 0.27 | 0.18 | 0.29 | 0.18 | 0.45 | 0.45 |
| T2 | 0.22 | 0.24 | 0.33 | 0.35 | 0.22 | 0.31 | 0.22 | 0.22 |
| G23 | 0.07 | 0.06 | 0.09 | 0.12 | 0.10 | 0.12 | 0.10 | 0.04 |
| T3 | 0.82 | 0.81 | 0.79 | 0.82 | 0.82 | 0.87 | 0.81 | 1.55 |
| G34 | 0.07 | 0.05 | 0.05 | 0.33 | 0.29 | 0.03 | 0.13 | 0.03 |
| T4 | 0.30 | 0.31 | 0.30 | 0.30 | 0.30 | 0.59 | 0.30 | 0.40 |
| G4F | 0.45 | 0.45 | 0.45 | 0.45 | 0.45 | 0.45 | 0.45 | 0.60 |
| TF | 0.21 | 0.21 | 0.21 | 0.21 | 0.21 | 0.21 | 0.21 | 0.21 |
| GFP | 0.44 | 0.40 | 0.50 | 0.32 | 0.32 | 0.31 | 0.40 | 0.32 |
| ALT | 1.67 | 1.74 | 1.80 | 1.80 | 1.74 | 2.11 | 1.66 | 2.47 |
| Gaa | 0.58 | 0.59 | 0.41 | 0.63 | 0.69 | 0.32 | 0.68 | 0.52 |

|  | 1st | 2nd | 3rd | 4th | 5th | 6th | 7th | 8th |
|---|---|---|---|---|---|---|---|---|
| \|v1-v2\| | 29.46 | 29.46 | 29.46 | 29.46 | 29.46 | 29.46 | 29.46 | 29.46 |
| (G12+T3)/(T1+G23) | 3.22 | 2.95 | 2.25 | 2.25 | 2.25 | 2.25 | 2.92 | 5.90 |
| ALT/Gaa | 2.89 | 2.94 | 4.34 | 2.84 | 2.53 | 6.51 | 2.45 | 4.77 |
| T3/Gaa | 1.42 | 1.37 | 1.91 | 1.30 | 1.20 | 2.67 | 1.20 | 3.00 |
| EFL/ALT | 1.37 | 1.30 | 1.29 | 1.32 | 1.36 | 1.12 | 1.40 | 0.95 |
| (T3+T4)/G12 | 2.53 | 2.32 | 4.00 | 6.32 | 3.86 | 8.23 | 2.49 | 4.35 |
| ALT/G12 | 3.76 | 3.60 | 6.60 | 10.13 | 5.97 | 11.95 | 3.72 | 5.51 |
| (T3+T4)/(T1+T2) | 2.05 | 1.81 | 1.54 | 1.66 | 1.83 | 2.21 | 2.04 | 3.75 |
| ALT/(G23+G34) | 12.45 | 15.91 | 12.71 | 3.94 | 4.40 | 14.30 | 7.18 | 35.63 |
| T3/(G23+G34) | 6.13 | 7.40 | 5.58 | 1.80 | 2.08 | 5.86 | 3.52 | 22.42 |
| T4/T2 | 1.35 | 1.28 | 0.92 | 0.85 | 1.36 | 1.91 | 1.36 | 1.80 |
| \|v1-v4\| | 0.00 | 0.00 | 0.00 | 0.00 | 0.00 | 0.00 | 0.00 | 0.00 |
| G12/T4 | 1.48 | 1.55 | 0.91 | 0.59 | 0.97 | 0.30 | 1.49 | 1.13 |
| T1/(G23+G34) | 2.43 | 3.42 | 2.70 | 0.71 | 1.00 | 2.36 | 1.41 | 4.33 |
| G12/T2 | 2.00 | 1.98 | 0.83 | 0.50 | 1.32 | 0.57 | 2.03 | 2.04 |

OPTICAL IMAGING LENS

TECHNICAL FIELD

The present disclosure relates to an optical imaging lens, and particularly, relates to an optical imaging lens having four lens elements.

BACKGROUND

Market demands for improved product specifications increase every day. In parallel, new developments for mobile devices as well as for their critical parts, such as optical imaging lenses, are diversified into various applications. For example, cameras may be used for taking a photograph or film, as a watchdog for environmental monitoring, as event data recorders, as reversing camera systems mounted on motor vehicles, etc. It may be desirable to achieve better imaging quality to better present details in recorded frames—particularly frames recorded in environments with insufficient light or recorded during movement (e.g. driving). It may also be desirable to provide an optical imaging lens which is compact and occupies little space. Such devices may require a wide view angle and/or a low focus number (Fno)—two features which may advantageously be provided by an optical imaging lens of the present disclosure.

Size reductions of an optical imaging lens cannot be achieved simply by proportionally shrinking the size of each element therein. Various aspects of the optical imaging lens, such as production difficulty, yield, material property, etc. should be taken into consideration. Therefore, production of a size-reduced optical imaging lens presents higher technical barriers and challenges than that of a conventional lens. Accordingly, achieving good optical characteristics in view of the various relevant considerations and technical barriers is a challenge in the industry.

SUMMARY

Embodiments of the present disclosure provide for various optical imaging lenses. An object of the present disclosure is to provide optical imaging lenses that have a shortened length but maintain good optical characteristics.

In some embodiments, an optical imaging lens may comprise, sequentially from an object side to an image side along an optical axis, a first lens element, an aperture stop, second, third and fourth lens elements. Each of the first, second, third and fourth lens elements may have an object-side surface facing toward the object side and an image-side surface facing toward the image side.

The lens elements may be designed in light of various optical characteristics and may be based upon the view angle of the optical imaging lens. In some embodiments of the present disclosure, the first lens element may have a positive refractive index, the second lens element may have a refractive index, and the image-side surface thereof may comprise a convex portion in a vicinity of a periphery of the second lens element, the third lens element may have a positive refractive index, and the object-side surface thereof may comprise a concave portion in a vicinity of the optical axis, the fourth lens element may have a refractive index, and the image-side surface thereof may comprise a concave portion in a vicinity of the optical axis I and a convex portion in a vicinity of a periphery of the fourth lens element.

In the specification, parameters used here are: a central thickness of the first lens element, represented by T1, an air gap between the first lens element and the second lens element along the optical axis, represented by G12, a central thickness of the second lens element, represented by T2, an air gap between the second lens element and the third lens element along the optical axis, represented by G23, a central thickness of the third lens element, represented by T3, an air gap between the third lens element and the fourth lens element along the optical axis, represented by G34, a central thickness of the fourth lens element, represented by T4, a distance between the image-side surface of the fourth lens element and the object-side surface of a filtering unit along the optical axis, represented by G4F, a central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, the refractive index of the first lens element, represented by n1, the refractive index of the second lens element, represented by n2, the refractive index of the third lens element, represented by n3, the refractive index of the fourth lens element, represented by n4, the refractive index of the filtering unit, represented by nf, the refractive index of the protection element, represented by nc, an abbe number of the first lens element, represented by v1, an abbe number of the second lens element, represented by v2, an abbe number of the third lens element, represented by v3, an abbe number of the fourth lens element, represented by v4, an abbe number of the filtering unit, represented by vf, an abbe number of the protection element, represented by vc, an effective focal length of the optical imaging lens, represented by EFL or f, a distance between the object-side surface of the first lens element and an image plane along the optical axis, represented by TTL, a sum of the central thicknesses of all four lens elements, i.e. a sum of T1, T2, T3 and T4, represented by ALT, a sum of all three air gaps from the first lens element to the fourth lens element along the optical axis, i.e. a sum of G12, G23 and G34, represented by Gaa, and a back focal length of the optical imaging lens, which is defined as the distance from the image-side surface of the fourth lens element to the image plane along the optical axis, i.e. a sum of G4F, TF, GFC, TC and GCP, and represented by BFL.

The optical imaging lens comprises no other lenses having refractive index beyond the four lens elements, and v1, v2, T1, T3, G12, G23, ALT and Gaa satisfy the inequalities: $|v1-v2| \geq 25$, $(G12+T3)/(T1+G23) \geq 2.25$, and $ALT/Gaa \geq 2.45$.

In other embodiments, other inequality(s), such as those relating to the ratio, difference, sum or so among parameters could be taken into consideration. Aspects of the embodiments described herein are not limited and could be selectively incorporated in other embodiments described herein.

In some embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

Through controlling the convex or concave shape of the surfaces and at lease one inequality, the optical imaging lens as described in some embodiments herein is capable of achieving good optical characteristics and effectively shortening the length of the optical imaging lens.

BRIEF DESCRIPTION OF THE DRAWINGS

The embodiments described herein will be more readily understood from the following detailed description when read in conjunction with the appended drawing, in which:

FIG. 1 is a cross-sectional view of one single lens element according to the present disclosure;

FIG. 2 is a cross-sectional view showing the relation between the shape of a portion and the position where a collimated ray meets the optical axis;

FIG. 3 is a cross-sectional view showing the relation between the shape of a portion and the effective radius of a first example;

FIG. 4 is a cross-sectional view showing the relation between the shape of a portion and the effective radius of a second example;

FIG. 5 is a cross-sectional view showing the relation between the shape of a portion and the effective radius of a third example;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of a seventh embodiment of an optical imaging lens according to the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 38 is a table for the values of T1, G12, T2, G23, T3, G34, T4, G4F, TF, GFP, ALT and Gaa of all eight example embodiments; and FIG. 39 is a table for the values of |v1−v2, (G12+T3)/(T1+G23), ALT/Gaa, T3/Gaa, EFL/ALT, (T3+T4)/G12, ALT/G12, (T3+T4)/(T1+T2), ALT/(G23+G34), T3/(G23+G34), T4/T2, |v1-v4|, G12/T4, T1/(G23+G34) and G12/T2 of all eight example embodiments.

DETAILED DESCRIPTION

Figure 6:
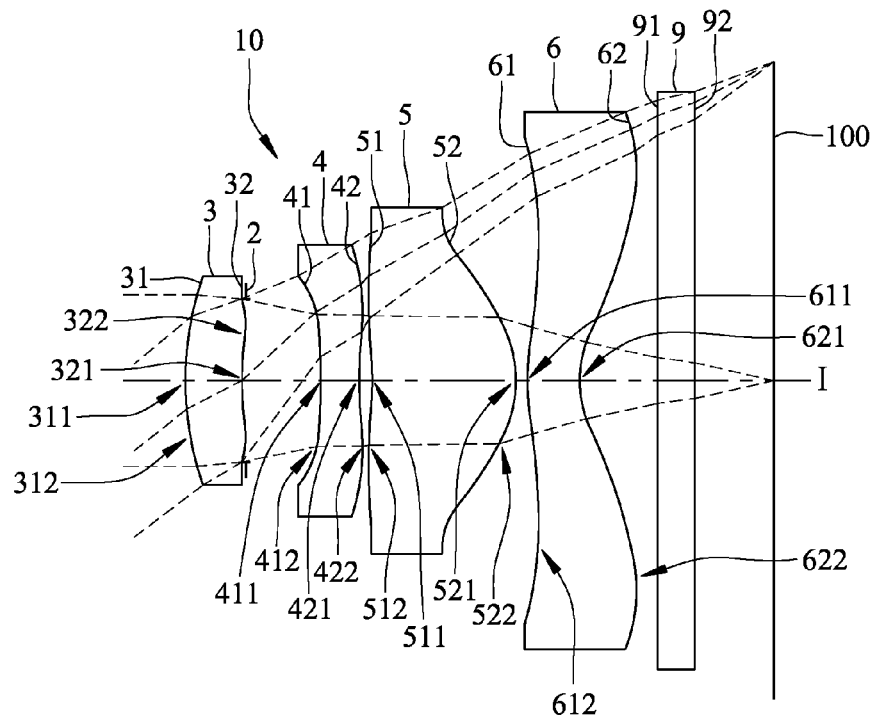
FIG. 6 is a cross-sectional view of a first embodiment of an optical imaging lens having four lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "embodiment," "example embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refractive index (or negative refractive index)" may mean that the paraxial refractive index of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a portion in a vicinity of the optical axis", and the region C of the lens element is defined as "a portion in a vicinity of a periphery of the lens element." Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because these imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis I within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis I and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave may depend on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion may be determined by whether the ray or its extension line meets (intersects) the optical axis I (focal point) at the object-side or image-side. For instance, if the ray itself intersects the optical axis I at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis I at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, another way to determine whether a portion in a vicinity of the optical axis I has a convex or concave shape by referring to the sign of an "R" value, which is the (paraxial) radius of curvature of a lens surface. The R value may be used in optical design software such as Zemax and CodeV. The R value may appear in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For cases with no transition points, the portion in a vicinity of the optical axis defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one transition point, namely a first transition point, may appear within the clear aperture of the image-side surface of the lens element. Portion I may be a portion in a vicinity of the optical axis, and portion II may be a portion in a vicinity of a periphery of the lens element. The portion in a vicinity of the optical axis I may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element has a convex shape.

Referring to the second example depicted in FIG. 4, a first transition point and a second transition point may exist on the object-side surface (within the clear aperture) of a lens element. As depicted in FIG. 4, portion I may be the portion in a vicinity of the optical axis, and portion III may be the portion in a vicinity of a periphery of the lens element. The portion in a vicinity of the optical axis I may have a convex shape because the R value at the object-side surface of the lens element is positive. The portion in a vicinity of a periphery of the lens element (portion III) may have a convex shape. What is more, there is another portion having a concave shape existing between the first and second transition point (portion II).

Referring to a third example depicted in FIG. 5, no transition point may exist on the object-side surface of the lens element. In this case, the portion between 0-50% of the effective radius (radius of the clear aperture) may be determined as the portion in a vicinity of the optical axis, and the portion between 50-100% of the effective radius may be determined as the portion in a vicinity of a periphery of the lens element. The portion in a vicinity of the optical axis I of the object-side surface of the lens element may be determined as having a convex shape due to its positive R value, and the portion in a vicinity of a periphery of the lens element may be determined as having a convex shape as well.

In the present disclosure, examples of an optical imaging lens which may be a prime lens are provided. Embodiments of an optical imaging lens may comprise a first lens element, a second lens element, a third lens element, a fourth lens element and a fifth lens element, each of the lens elements may comprise a refractive index, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refractive index beyond the four lens elements.

Figure 7:
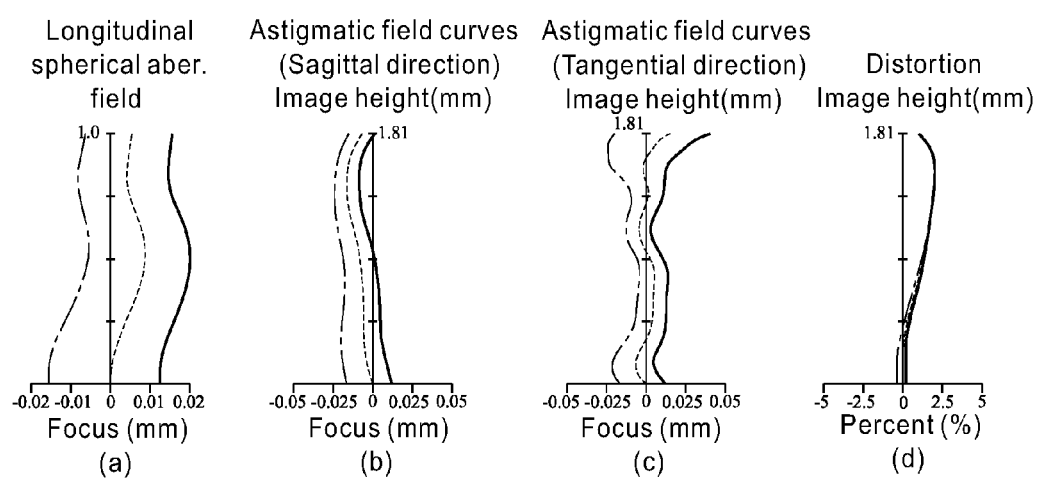
FIG. 7 is a chart of longitudinal spherical aberration and other kinds of optical aberrations of a first embodiment of the optical imaging lens according to the present disclosure.

Several embodiments and associated optical data will now be provided for illustrating various embodiments of optical imaging lenses having good optical characteristics, such as a large view angle and a small focus number. Reference is now made to FIGS. 6-9. FIG. 6 illustrates an example cross-sectional view of an optical imaging lens 10 having four lens elements of the optical imaging lens according to a first example embodiment. FIG. 7 shows example charts of longitudinal spherical aberration and other kinds of optical aberrations of the optical imaging lens 10 according to an example embodiment. FIG. 8 illustrates an example table of optical data of each lens element of the optical imaging lens 10 according to an example embodiment, in which f is used for representing EFL. FIG. 9 depicts an example table of aspherical data of the optical imaging lens 10 according to an example embodiment.

As shown in FIG. 6, the optical imaging lens 10 of the present embodiment may comprise, in order from an object side to an image side along an optical axis, a first lens element 3, an aperture stop 2, a second lens element 4, a third lens element 5, a fourth lens element 6 and a filtering unit 9. Light may enter the optical imaging lens 10, pass through the first lens element 3, the aperture stop 2, the second lens element 4, the third lens element 5, the fourth lens element 6 and the filtering unit 9, and then form an image on an image plane 100. The example embodiment of the filtering unit 9 which may selectively absorb light with specific wavelength from the light passing optical imaging lens 10 is an IR cut filter (infrared cut filter). Then, IR light may be absorbed, and this may prohibit the IR light, which is not seen by human eyes, from affecting the image on the image plane 100. Please note that the object side is the side facing to an object to be shot, and the image side is the side facing to the image plane 100.

It is to be understood that during the normal operation of the optical imaging lens 1, the distance between any two adjacent lens elements of the first, second, third and fourth lens elements 3, 4, 5, 6 may be an unchanged value, i.e. the optical imaging lens 10 may be a prime lens.

In some embodiments, each lens element of the optical imaging lens 10 may be constructed by plastic material to meet the requirement of a lightweight product; however, other transparent material, such as glass material, etc. may be utilized for constructing any of the lens elements.

An example embodiment of the first lens element 3 may have a positive refractive index. The object-side surface 31 may be a convex surface comprising a convex portion 311 in a vicinity of the optical axis I and a convex portion 312 in a vicinity of a periphery of the first lens element 3. The image-side surface 32 may comprise a concave portion 321 in a vicinity of the optical axis I and a convex portion 322 in a vicinity of the periphery of the first lens element 3.

An example embodiment of the second lens element 4 may have a negative refractive index. The object-side surface 41 may have a concave surface comprising a concave portion 411 in a vicinity of the optical axis I and a concave portion 412 in a vicinity of a periphery of the second lens element 4. The image-side surface 42 may comprise a concave portion 421 in a vicinity of the optical axis I and a convex portion 422 in a vicinity of the periphery of the second lens element 4.

An example embodiment of the third lens element 5 may have a positive refractive index. The object-side surface 51 may comprise a concave portion 511 in a vicinity of the optical axis I and a convex portion 512 in a vicinity of a periphery of the third lens element 5. The image-side surface 52 may be a convex surface comprising a convex portion 521 in a vicinity of the optical axis I and a convex portion 522 in the vicinity of the periphery of the third lens element 5.

An example embodiment of the fourth lens element 6 may have a negative refractive index. The object-side surface 61 may comprise a convex portion 611 in a vicinity of the optical axis I and a concave portion 612 in a vicinity of a periphery of the fourth lens element 6. The image-side surface 62 may comprise a concave portion 621 in a vicinity of the optical axis I and a convex portion 622 in a vicinity of the periphery of the fourth lens element 6.

In an embodiment, at least one of the first lens element 3, the second lens element 4, the third lens element 5, and the fourth lens element 6 has a positive refractive index. In another embodiment, at least one of the first lens element 3, the second lens element 4, the third lens element 5, and the fourth lens element 6 has a negative refractive index. Yet, in another embodiment, only the first lens element 3, the second lens element 4, the third lens element 5, and the fourth lens element 6 has a refractive index other than zero in the optical imaging lens 10.

FIG. 8 depicts the optical characteristics of each lens element in the optical imaging lens 10 of the present embodiment. For the optical imaging lens 10 of the present embodiment, the EFL may be about 2.295 mm, HFOV (half field of view) may be about 37.999 degrees, Fno (f-number) may be about 2.391, and the length (the distance from the object-side surface 31 of the first lens element 3 to the image plane 100 along the optical axis) may be about 3.352 mm. Please refer to FIG. 38 and FIG. 39 for the values of parameters of the optical imaging lens 10 of the present embodiment.

The aspherical surfaces, including the object-side surface 31 and the image-side surface 32 of the first lens element 3, the object-side surface 41 and the image-side surface 42 of the second lens element 4, the object-side surface 51 and the image-side surface 52 of the third lens element 5 and the object-side surface 61 and the image-side surface 62 of the fourth lens element 6 may all be defined by the following aspherical formula:

$$Z(Y) = \frac{Y^2}{R} \Big/ \left(1 + \sqrt{1 - (1+K)\frac{Y^2}{R^2}}\right) + \sum_{i=1}^{N} a_{2i} \times Y^{2i} \quad (1)$$

wherein, Y represents the perpendicular distance between the point of the aspherical surface and the optical axis; Z represents the depth of the aspherical surface (the perpendicular distance between the point of the aspherical surface at a distance Y from the optical axis I and the tangent plane of the vertex on the optical axis I of the aspherical surface); R represents the radius of curvature of the surface of the lens element; K represents a conic constant; and $a_i$ represents an aspherical coefficient of $i^{th}$ level. The values of each aspherical parameter for the formula (1) are shown in FIG. 9. In FIG. 9, a column labeled 31 is filed with the aspherical parameters of the object-side surface 31 of the first lens element 3, and the rests are filed in a similar way.

FIG. 7 part (a) depicts longitudinal spherical aberration of the optical imaging lens in the present embodiment; the horizontal axis represents focus and the vertical axis represents field of view. FIG. 7 part (b) depicts astigmatism aberration of the optical imaging lens in the present embodiment in the sagittal direction; the horizontal axis represents focus and the vertical axis represents image height. FIG. 7 part (c) illustrates astigmatism aberration in the tangential direction of the optical imaging lens in the present embodiment. The horizontal axis represents focus and the vertical axis represents image height. FIG. 7 part (d) depicts distortion aberration of the optical imaging lens in the present embodiment; the horizontal axis represents percentage and the vertical axis represents image height. In FIG. 7 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 7 part (b) and part (c), for astigmatism aberration in the sagittal and tangential directions, the focus variation with respect to the three wavelengths in the whole field may fall within about ±0.04 mm. This reflects that the present embodiment may improve the astigmatism aberration effectively. In FIG. 7 part (d), the variation of the distortion aberration may be within about ±2.5%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Figure 10:
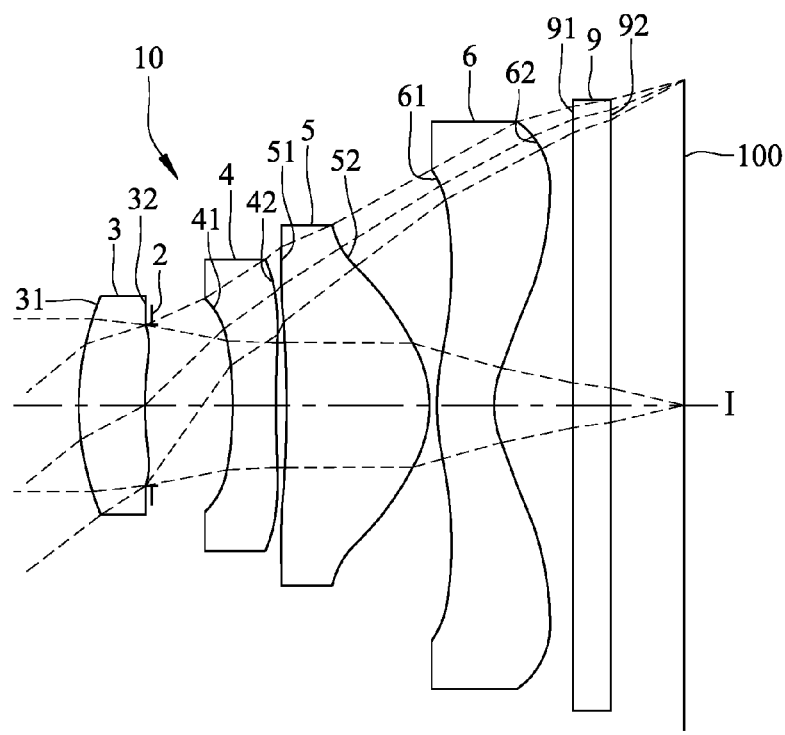
FIG. 10 is a cross-sectional view of a second embodiment of an optical imaging lens having four lens elements according to the present disclosure.

Reference is now made to FIG. 10, which illustrates an example cross-sectional view of an optical imaging lens 10 according to a second example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the second embodiment and the first embodiment may include the radius of curvature and thickness of each lens element, the distance of each air gap, aspherical data and related optical parameters, such as back focal length. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 12, which further shows the EFL may be about 2.261 mm, HFOV (half field of view) may be about 38.229 degrees, Fno (f-number) may be about 2.356, and the length may be about 3.393 mm.

FIG. 13 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 11:
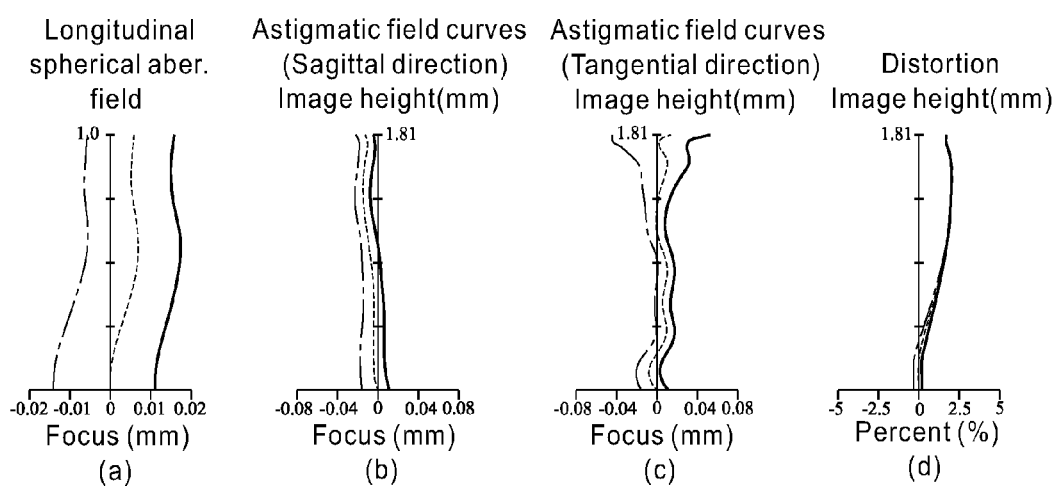
FIG. 11 is a chart of longitudinal spherical aberration and other kinds of optical aberrations of a second embodiment of the optical imaging lens according to the present disclosure.

The improved optical performance provided by the present embodiment is further indicated with reference to the longitudinal spherical aberration shown in FIG. 11 part (a), the astigmatism aberration in the sagittal direction shown in FIG. 11 part (b), the astigmatism aberration in the tangential direction shown in FIG. 11 part (c), and the distortion aberration shown in FIG. 11 part (d).

In FIG. 11 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 11 part (b) and part (c), for astigmatism aberration in the sagittal and tangential directions, the focus variation with respect to the three wavelengths in the whole field may fall within about ±0.04 mm~±0.08 mm. This reflects that the present embodiment may improve the astigmatism aberration effectively. In FIG. 11 part (d), the variation of the distortion aberration may be within about ±5%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment shows improved HFOV and less Fno.

Figure 14:
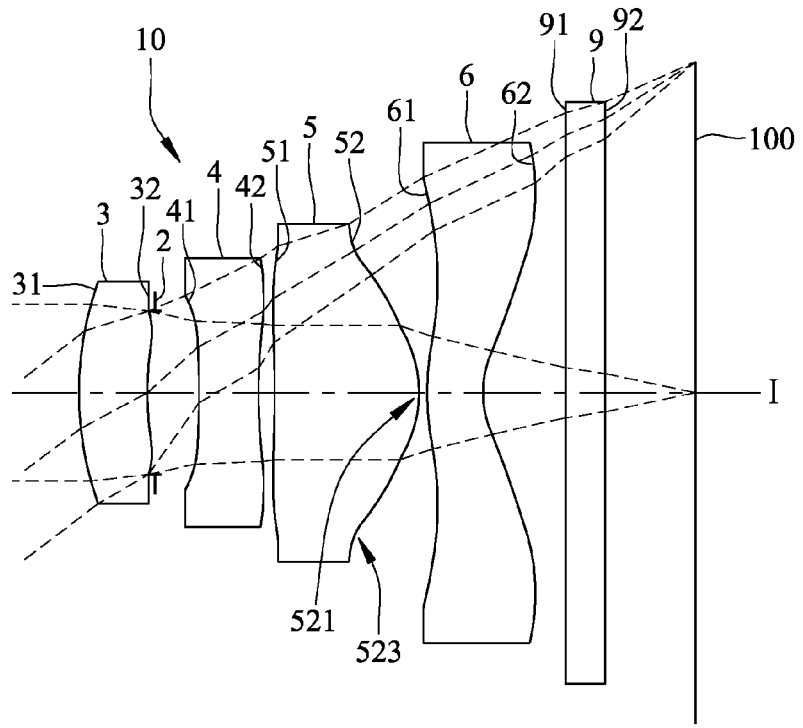
FIG. 14 is a cross-sectional view of a third embodiment of an optical imaging lens having four lens elements according to the present disclosure.

Reference is now made to FIG. 14, which illustrates an example cross-sectional view of an optical imaging lens 10 according to a third example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the third embodiment and the first embodiment may include the radius of curvature and thickness of each lens element, the distance of each air gap, aspherical data, and related optical parameters, such as back focal length. The shape of the image-side surface 52 of the third lens element 5 is different too. The image-side surface 52 comprises a convex portion 521 in a vicinity of the optical axis I and a concave portion 523 in a vicinity of a periphery of the third lens element 5. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 16, which further shows the EFL may be about 2.318 mm, HFOV may be about 38.000 degrees, Fno may be about 2.415, and the length may be about 3.372 mm.

FIG. 17 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 15:
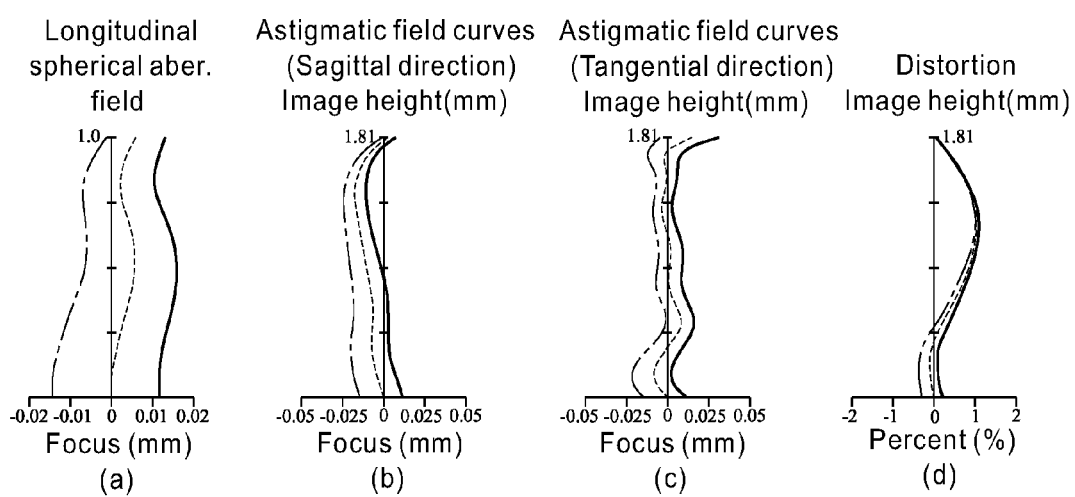
FIG. 15 is a chart of longitudinal spherical aberration and other kinds of optical aberrations of a third embodiment of the optical imaging lens according the present disclosure.

The improved optical performance provided by the present embodiment is further indicated with reference to the longitudinal spherical aberration shown in FIG. 15 part (a), the astigmatism aberration in the sagittal direction shown in FIG. 15 part (b), the astigmatism aberration in the tangential direction shown in FIG. 15 part (c), and the distortion aberration shown in FIG. 15 part (d).

In FIG. 15 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 15 part (b) and part (c), for astigmatism aberration in the sagittal and tangential directions, the focus variation with respect to the three wavelengths in the whole field may fall within about ±0.05 mm. This reflects that the present embodiment may improve the astigmatism aberration effectively. In FIG. 15 part (d), the variation of the distortion aberration may be within about ±5%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may be easier to make, which may result in improved HFOV and higher yield.

Figure 18:
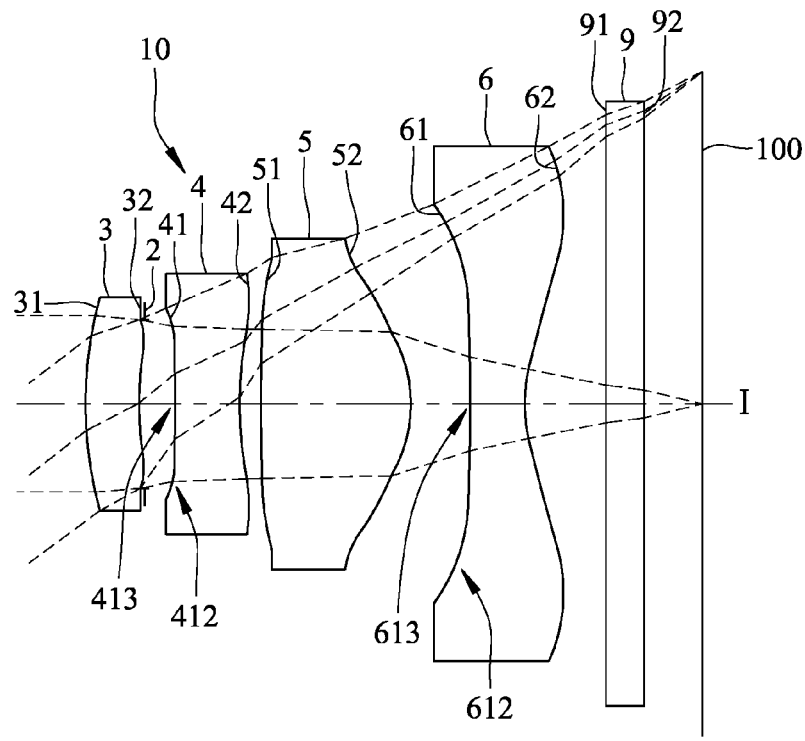
FIG. 18 is a cross-sectional view of a fourth embodiment of an optical imaging lens having four lens elements according to the present disclosure.

Reference is now made to FIG. 18, which illustrates an example cross-sectional view of an optical imaging lens 10 according to a fourth example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the fourth embodiment and the first embodiment may include the radius of curvature and thickness of each lens element, the distance of each air gap, aspherical data and related optical parameters, such as back focal length. The shapes of the object-side surface 41 of the second lens element 4 and object-side surface 61 of the fourth lens element 6 are different too. The object-side surface 41 comprises a convex portion 413 in a vicinity of the optical axis I and a concave portion 412 in a vicinity of a periphery of the second lens element 4. The object-side surface 61 is a concave surface comprising a concave portion 613 in a vicinity of the optical axis I and a concave portion 612 in a vicinity of a periphery of the fourth lens element 6. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 20, which further shows the EFL may be about 2.362 mm, HFOV may be about 37.992 degrees, Fno may be about 2.461, and the length may be about 3.412 mm.

FIG. 21 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 19:
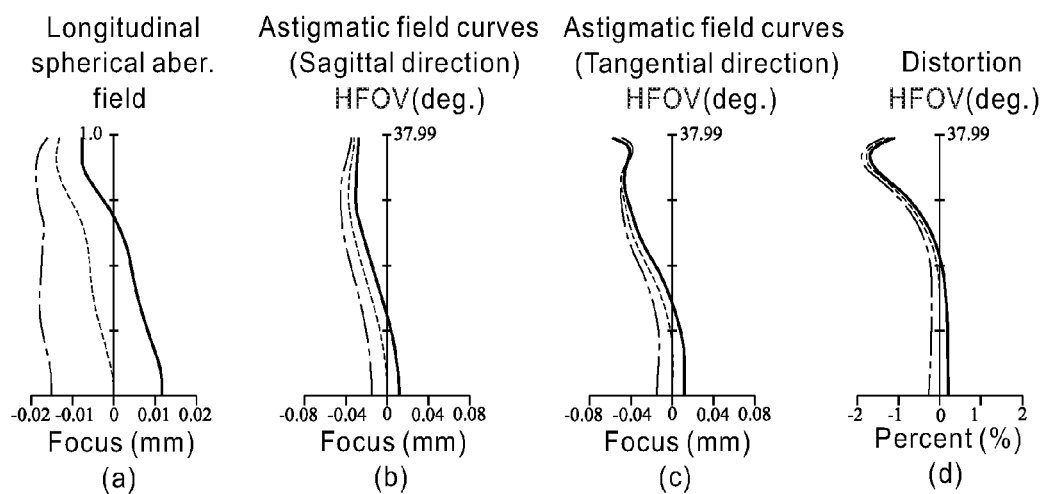
FIG. 19 is a chart of longitudinal spherical aberration and other kinds of optical aberrations of a fourth embodiment of the optical imaging lens according the present disclosure.

The improved optical performance provided by the present embodiment is further indicated with reference to the longitudinal spherical aberration shown in FIG. 19 part (a), the astigmatism aberration in the sagittal direction shown in FIG. 19 part (b), the astigmatism aberration in the tangential direction shown in FIG. 19 part (c), and the distortion aberration shown in FIG. 19 part (d).

In FIG. 19 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 19 part (b) and part (c), for astigmatism aberration in the sagittal and tangential directions, the focus variation with respect to the three wavelengths in the whole field may fall within about ±0.08 mm. This reflects that the present embodiment may improve the astigmatism aberration effectively. In FIG. 19 part (d), the variation of the distortion aberration may be within about ±2%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may be easier to make, which may result in improved imaging quality and higher yield.

Figure 22:
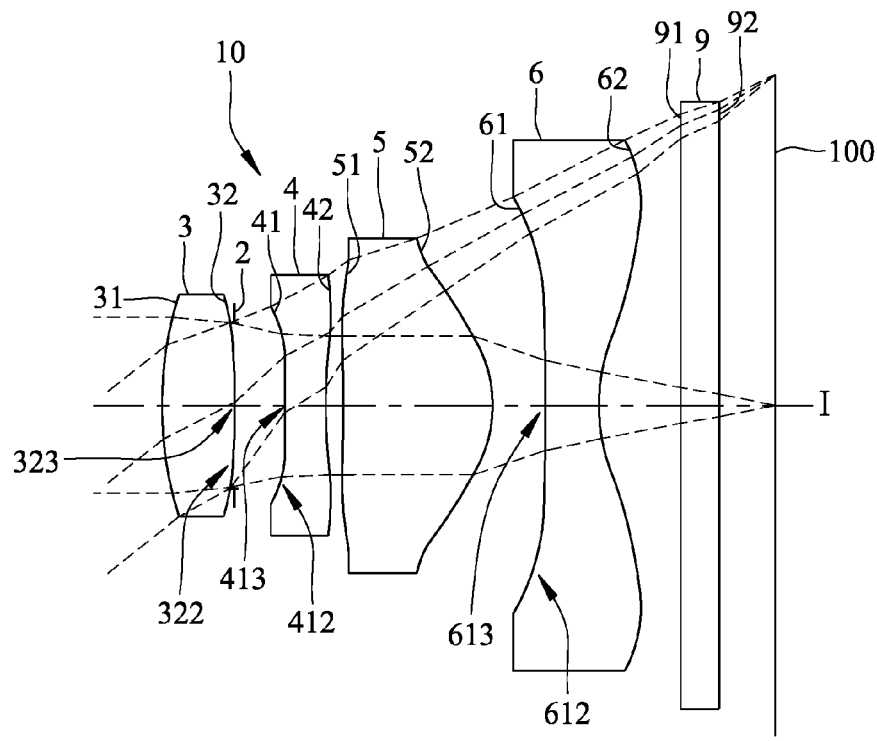
FIG. 22 is a cross-sectional view of a fifth embodiment of an optical imaging lens having four lens elements according to the present disclosure.

Reference is now made to FIG. 22, which illustrates an example cross-sectional view of an optical imaging lens 10 according to a fifth example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the fifth embodiment and the first embodiment may include the radius of curvature and thickness of each lens element, the distance of each air gap, aspherical data and related optical parameters, such as back focal length. The shapes of the image-side surface 32 of the first lens element 3, object-side surface 41 of the second lens element 4 and object-side surface 61 of the fourth lens element 6 are different too. The image-side surface 32 is a convex surface comprising a convex portion 323 in a vicinity of the optical axis I and a convex portion 322 in a vicinity of a periphery of the first lens element 3. The object-side surface 41 comprises a convex portion 413 in a vicinity of the optical axis I and a concave portion 412 in a vicinity of a periphery of the second lens element 4. The object-side surface 61 is a concave surface comprising a concave portion 613 in a vicinity of the optical axis I and a concave portion 612 in a vicinity of a periphery of the fourth lens element 6. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 24, which further shows the EFL may be about 2.360 mm, HFOV may be about 37.998 degrees, Fno may be about 2.459, and the length may be about 3.407 mm.

FIG. 25 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 23:
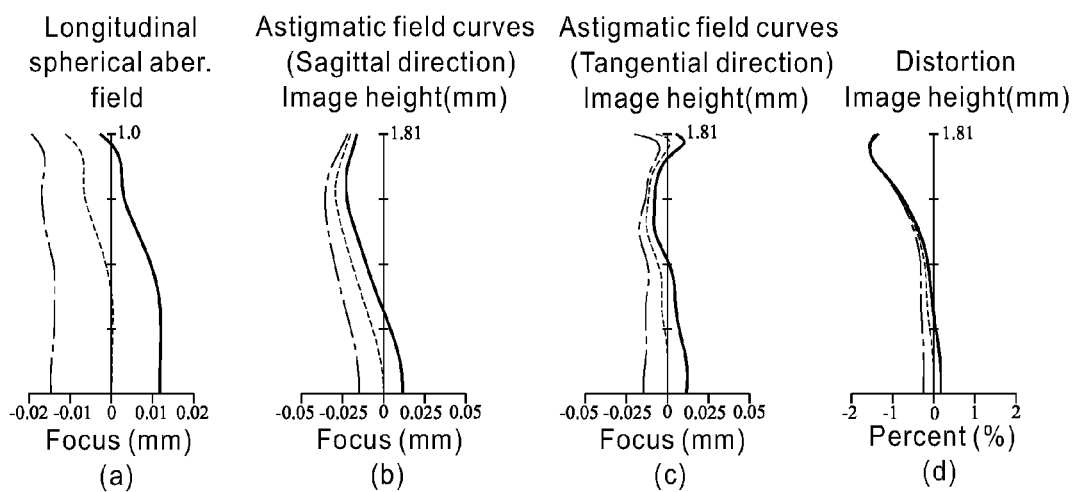
FIG. 23 is a chart of longitudinal spherical aberration and other kinds of optical aberrations of a fifth embodiment of the optical imaging lens according the present disclosure.

The improved optical performance provided by the present embodiment is further indicated with reference to the longitudinal spherical aberration shown in FIG. 23 part (a), the astigmatism aberration in the sagittal direction shown in FIG. 23 part (b), the astigmatism aberration in the tangential direction shown in FIG. 23 part (c), and the distortion aberration shown in FIG. 23 part (d).

In FIG. 23 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 23 part (b) and part (c), for astigmatism aberration in the sagittal and tangential directions, the focus variation with respect to the three wavelengths in the whole field may fall within about ±0.05 mm. This reflects that the present embodiment may improve the astigmatism aberration effectively. In FIG. 23 part (d), the variation of the distortion aberration may be within about ±2%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may be easier to make, which may result in improved imaging quality and higher yield.

Figure 26:
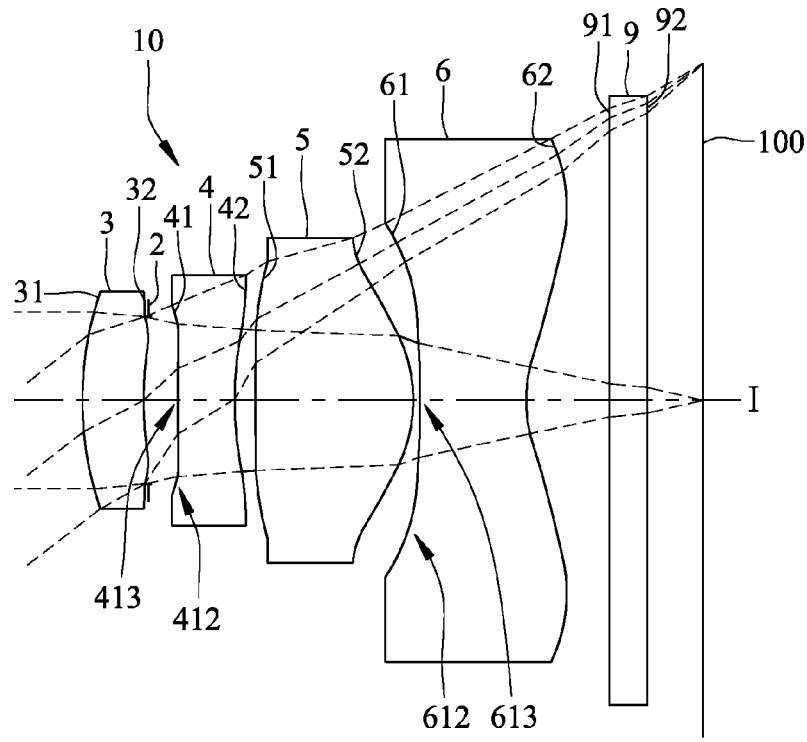
FIG. 26 is a cross-sectional view of a sixth embodiment of an optical imaging lens having four lens elements according to the present disclosure.

Reference is now made to FIG. 26, which illustrates an example cross-sectional view of an optical imaging lens 10 according to a sixth example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the sixth embodiment and the first embodiment may include the radius of curvature and thickness of each lens element, the distance of each air gap, aspherical data and related optical parameters, such as back focal length. The shapes of the object-side surface 41 of the second lens element 4 and object-side surface 61 of the fourth lens element 6 are different too. The object-side surface 41 comprises a convex portion 413 in a vicinity of the optical axis I and a concave portion 412 in a vicinity of a periphery of the second lens element 4. The object-side surface 61 is a concave surface comprising a concave portion 613 in a vicinity of the optical axis I and a concave portion 612 in a vicinity of a periphery of the fourth lens element 6. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 28, which further shows the EFL may be about 2.362 mm, HFOV may be about 37.997 degrees, Fno may be about 2.461, and the length may be about 3.411 mm.

FIG. 29 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 27:
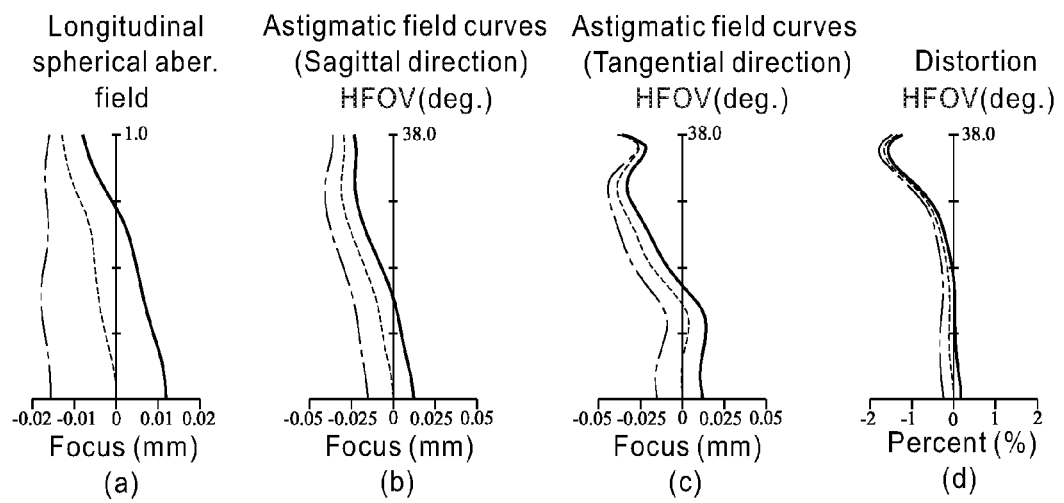
FIG. 27 is a chart of longitudinal spherical aberration and other kinds of optical aberrations of a sixth embodiment of the optical imaging lens according the present disclosure.

The improved optical performance provided by the present embodiment is further indicated with reference to the longitudinal spherical aberration shown in FIG. 27 part (a), the astigmatism aberration in the sagittal direction shown in FIG. 27 part (b), the astigmatism aberration in the tangential direction shown in FIG. 27 part (c), and the distortion aberration shown in FIG. 27 part (d).

In FIG. 27 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 27 part (b) and part (c), for astigmatism aberration in the sagittal and tangential directions, the focus variation with respect to the three wavelengths in the whole field may fall within about ±0.05 mm. This reflects that the present embodiment may improve the astigmatism aberration effectively. In FIG. 27 part (d), the variation of the distortion aberration may be within about ±2%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may be easier to make, which may result in improved imaging quality and higher yield.

Figure 30:
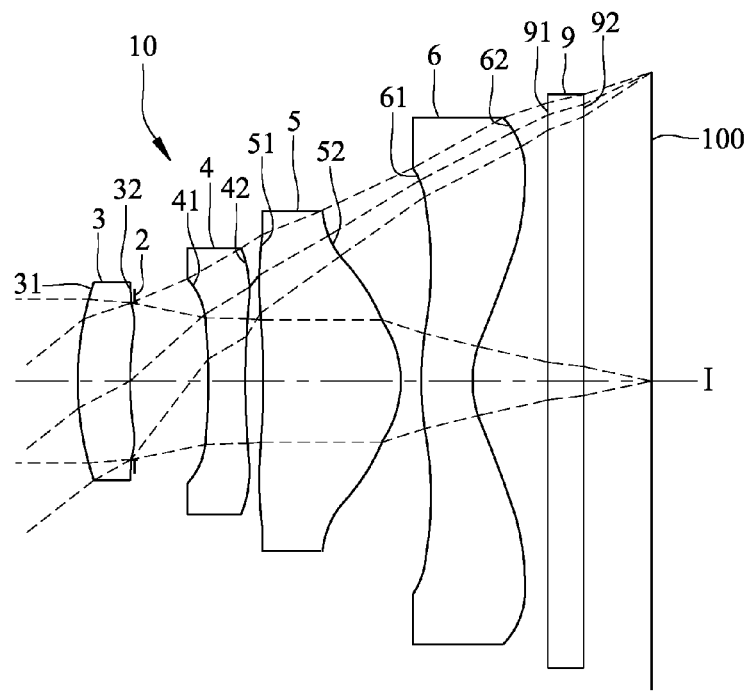
FIG. 30 is a cross-sectional view of a seventh embodiment of an optical imaging lens having four lens elements according to the present disclosure.

Reference is now made to FIG. 30, which illustrates an example cross-sectional view of an optical imaging lens 10 according to a seventh example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the seventh embodiment and the first embodiment may include the radius of curvature and thickness of each lens element, the distance of each air gap, aspherical data and related optical parameters, such as back focal length. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment is shown in FIG. 32, which further shows the EFL may be about 2.316 mm, HFOV may be about 38.000 degrees, Fno may be about 2.413, and the length may be about 3.396 mm.

FIG. 33 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 31:
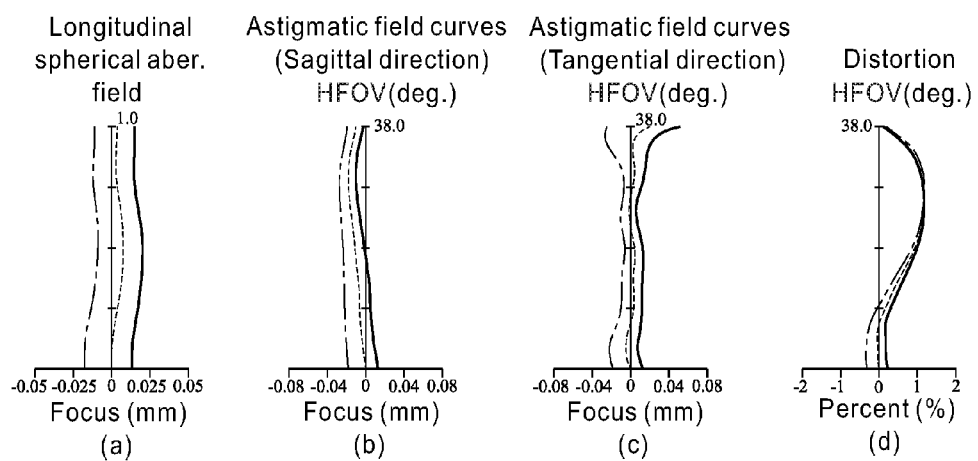
FIG. 31 is a chart of longitudinal spherical aberration and other kinds of optical aberrations of a seventh embodiment of the optical imaging lens according to the present disclosure.

The improved optical performance provided by the present embodiment is further indicated with reference to the longitudinal spherical aberration shown in FIG. 31 part (a), the astigmatism aberration in the sagittal direction shown in FIG. 31 part (b), the astigmatism aberration in the tangential direction shown in FIG. 31 part (c), and the distortion aberration shown in FIG. 31 part (d).

In FIG. 31 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 31 part (b) and part (c), for astigmatism aberration in the sagittal and tangential directions, the focus variation with respect to the three wavelengths in the whole field may fall within about ±0.04 mm~±0.08 mm. This reflects that the present embodiment may improve the astigmatism aberration effectively. In FIG. 31 part (d), the variation of the distortion aberration may be within about ±2%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may be easier to make, which may result in improvements to HFOV and imaging quality.

Figure 34:
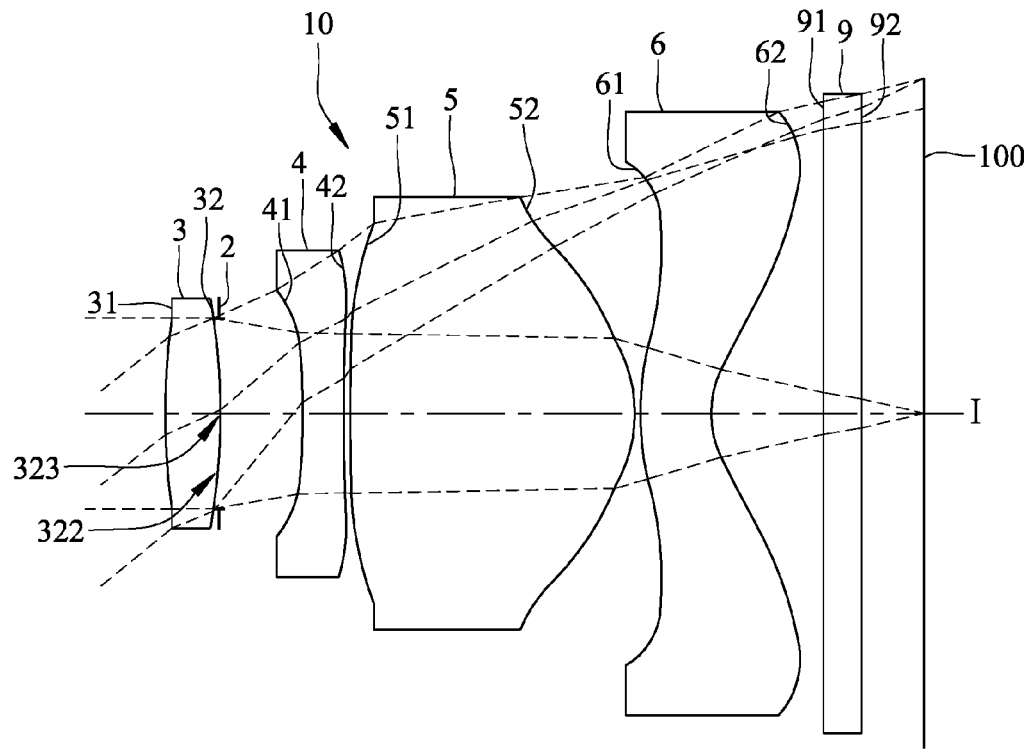
FIG. 34 is a cross-sectional view of an eighth embodiment of an optical imaging lens having four lens elements according to the present disclosure.

Reference is now made to FIG. 34, which illustrates an example cross-sectional view of an optical imaging lens 10 according to an eighth example embodiment. The optical imaging lens 10 of the present embodiment, in an order from an object side to an image side along an optical axis, may comprise a first lens element 3, an aperture stop 2, a second lens element 4, a third lens element 5, and a fourth lens element 6. The differences between the eighth embodiment and the first embodiment may include the radius of curvature and thickness of each lens element, the distance of each air gap, aspherical data and related optical parameters, such as back focal length. The shape of the image-side surface 32 of the first lens element 3 is different too. The image-side surface 32 is a convex surface comprising a convex portion 323 in a vicinity of the optical axis I and a convex portion 322 in a vicinity of a periphery of the first lens element 3. Here, for clearly showing the drawings of the present embodiment, only the surface shapes which are different from that in the first embodiment are labeled, and the reference numbers in the present embodiment are labeled similarly to those in the first embodiment for the similar elements.

The optical data of each lens element in the optical imaging lens 10 of the present embodiment shown in FIG. 36, which further shows the EFL may be about 2.337 mm, HFOV may be about 37.998 degrees, Fno may be about 2.250, and the length may be about 4.112 mm.

FIG. 37 shows aspherical data of each aspherical surface of the first, second, third and fourth lens elements 3, 4, 5, 6 in the optical imaging lens 10 for bringing to the formula (1).

Please refer to FIG. 38 and FIG. 39 for the values of parameters of the optical imaging lens 10 of the present embodiment.

Figure 35:
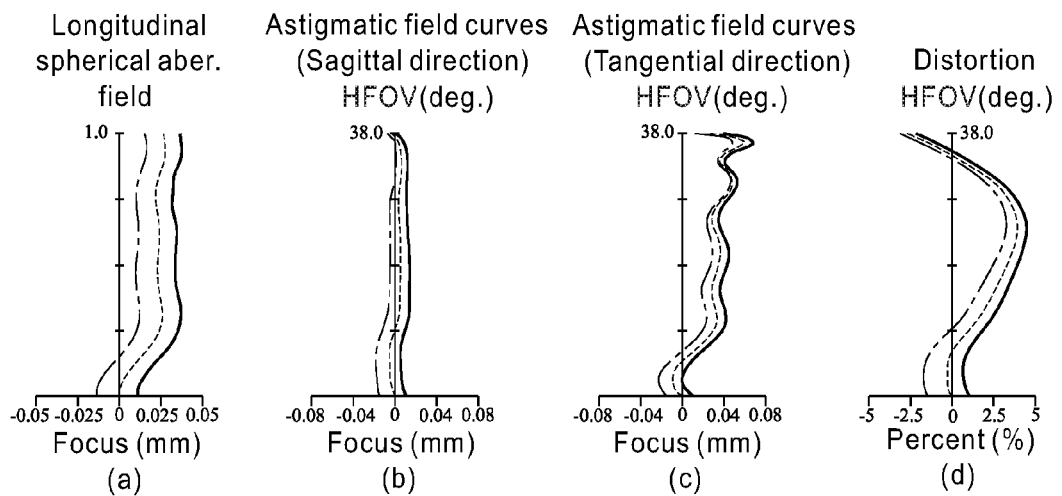
FIG. 35 is a chart of longitudinal spherical aberration and other kinds of optical aberrations of an eighth embodiment of the optical imaging lens according to the present disclosure.

The improved optical performance provided by the present embodiment is further indicated with reference to the longitudinal spherical aberration shown in FIG. 35 part (a), the astigmatism aberration in the sagittal direction shown in FIG. 35 part (b), the astigmatism aberration in the tangential direction shown in FIG. 35 part (c), and the distortion aberration shown in FIG. 35 part (d).

In FIG. 35 part (a), the curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.02 mm. Therefore, the present embodiment may improve the longitudinal spherical aberration with respect to different wavelengths. Additionally, the closed curves represent the extent to which dispersion is improved.

In FIG. 35 part (b) and (c), for astigmatism aberration in the sagittal and tangential directions, the focus variation with respect to the three wavelengths in the whole field may fall within about ±0.04 mm~±0.08 mm. This reflects that the present embodiment may improve the astigmatism aberration effectively. In FIG. 35 part (d), the variation of the distortion aberration may be within about ±5%. This means that the controlled distortion aberration of the optical imaging lens 10 of the present embodiment meets the requirement of the imaging quality. As such, the optical imaging lens 10 is capable of great optical performance, providing the short length as well as the broad shot angle.

Compared with the first embodiment, the present embodiment may result in an improved Fno.

Please refer to FIG. 38 and FIG. 39, which shows the values of parameters of all eight embodiments. When the optical imaging lens of the present disclosure satisfies some of the inequalities listed bellow, the length may be shortened while maintaining good optical characteristics to push thinner products of mobile devices ahead.

(1) When $|v1-v2|\geq 25$ is satisfied, axial and off-axis chromatic aberration may be adjusted and stabilized well. However, if the difference of $|v1-v2|$ is lower than 25, the axial chromatic aberration decreases greater in an area of short wavelength than that of a referred wavelength, so that chromatic aberration is not adjusted effectively. Decreasing the Abbe number of the second lens element 4 may facilitate adjusting the axial chromatic aberration well, but adjusting the off-axis chromatic aberration overly.

(2) These inequalities, comprising $(G12+T3)/(T1+G23)\geq 2.25$, $ALT/Gaa\geq 2.45$, $T3/Gaa\geq 1.2$, $(T3+T4)/G12\geq 2.4$, $ALT/G12\geq 3.6$, $(T3+T4)/(T1+T2)\leq 2.05$, $ALT/(G23+G34)\leq 12.45$, $T3/(G23+G34)\leq 7.4$, $T4/T2\leq 1.35$ and $v1/v4\leq 1.05$, in some embodiments $6.5\geq (G12+T3)/(T1+G23)\geq 2.25$, $7\geq ALT/Gaa\geq 2.45$, $3.5\geq T3/Gaa\geq 1.20$, $9\geq (T3+T4)/G12\geq 2.4$, $14\geq ALT/G12\geq 3.6$, $1\leq (T3+T4)/(T1+T2)\leq 2.05$, $4\leq ALT/(G23+G34)\leq 12.45$, $1.6\leq T3/(G23+G34)\leq 7.4$, $0.8\leq T4/T2\leq 1.35$ and $v1/v4\leq 1.05$, are designed for facilitating a proper value of the parameters of each lens element to account for the shortening of the length of the optical imaging lens 10 or increasing the difficulty in the production procedures.

(3) When EFL/ALT 1.3 is satisfied, the relation between the ALT and EFL may be proper. In an embodiment, 1.6 EFL/ALT 1.3 is satisfied to avoid an excessive value of EFL/ALT bringing an excessive light path to elongate the length of the optical imaging lens 10. In another embodiment, 1.6 EFL/ALT 1.3 is further satisfied to avoid an insufficient value of EFL/ALT suppressing light path to make adjustment of all types of the aberrations difficult and raise the difficulty in the production procedures.

(4) When $0.95\leq v1/v4\leq 1.05$ is satisfied, each of the aberrations may be finely adjusted. If the value of v1/v4 exceeds the range, some of the aberrations may not be finely adjusted well.

In light of the unpredictability in an optical system, the present disclosure provides for controlling the convex or concave shape of the surfaces and satisfying at least three of the inequalities listed above, which may, in some embodiments, shorten the length of the optical imaging lens as well as achieve good optical characteristics, and, in some embodiments, lower the f-number, enlarge the view angle of the optical imaging lens, promote the imaging quality and/or increase the yield in the assembly process. In some embodiments, more details about the convex or concave surface structure could be incorporated for one specific lens element or broadly for plural lens elements to enhance the control for the system performance and/or resolution, for example, the object-side surface 41 of the second lens element 4 may comprise a convex portion 413 in a vicinity of the optical axis I and a concave portion 412 in a vicinity of a periphery of the second lens element 4. It is noted that the details listed here could be incorporated in example embodiments if no inconsistency occurs.

In some embodiments, the optical imaging lens 10 of the present disclosure may achieve the effects listed below:

(1) Each lens element may be designed in light of the optical characteristics and length of the optical imaging lens 10. For example, the positive refractive index of the first lens element 3 may assist in collecting light, and together with the position of the aperture stop 2, behind the image-side surface 3 of the first lens element 3, the view angle may be enlarged. The positive refractive index of the third lens element 3 is stronger than that of the other lens element, and this may be benefit to the main adjustment of each aberration. Combining all the details on the surfaces, including the convex portion 422 in the vicinity of the periphery of the second lens element 4 on the image-side surface 42, the concave portion 511 in the vicinity of the optical axis I on the object-side surface 51 of the third lens element 5, the concave portion 621 in the vicinity of the optical axis I on the image-side surface 62 and the convex portion 622 in the vicinity of the periphery of the fourth lens element 6 on the image-side surface 62, the imaging quality may be promoted. The position of the aperture stop 2 may be designed in light of all kinds of factors, such as the shape of the surfaces of the lens elements, the thickness of the lens elements, the distance of the air gaps between the lens elements, etc.

(2) The longitudinal spherical aberration, astigmatism aberration and distortion aberration of each embodiment listed above meet user term of a related product in the market. The off-axis light with respect to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

(3) According to above eight embodiments, the system length of the optical imaging lens 10 may be shortened to about 4.112 mm or below. Compared with ordinary lens, with the optical imaging lens 10 according to the present disclosure, slimmer products may be presented to the market.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

While various embodiments in accordance with the disclosed principles have been described above, it should be understood that they are presented by way of example only, and are not limiting. Thus, the breadth and scope of the embodiment(s) described herein should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, an aperture stop, and second, third and fourth lens elements, each of the first, second, third and fourth lens elements having an object-side surface facing toward the object side and an image-side surface facing toward the image side, wherein:
the first lens element has a positive refractive index;
the second lens element has a refractive index, and the image-side surface thereof comprises a convex portion in a vicinity of a periphery of the second lens element;
the third lens element has a positive refractive index, and the object-side surface thereof comprises a concave portion in a vicinity of the optical axis;
the fourth lens element has a refractive index, and the image-side surface thereof comprises a concave portion in a vicinity of the optical axis I and a convex portion in a vicinity of a periphery of the fourth lens element;
the optical imaging lens comprises no other lenses having refractive index beyond the four lens elements; and
an abbe number of the first lens element is represented by v1, an abbe number of the second lens element is represented by v2, a central thickness of the first lens element is represented by T1, a central thickness of the third lens element is represented by T3, an air gap between the first lens element and the second lens element along the optical axis represented by G12, an air gap between the second lens element and the third lens element along the optical axis represented by G23, a sum of the central thicknesses of all four lens elements is represented by ALT, a sum of all three air gaps from the first lens element to the fourth lens element along the optical axis represented by Gaa, and v1, v2, T1, T3, G12, G23, ALT and Gaa satisfy the inequalities:

$|v1-v2| \geq 25$, $(G12+T3)/(T1+G23) \geq 2.25$, and $ALT/Gaa \geq 2.45$.

2. The optical imaging lens according to claim 1, wherein an effective focal length of the optical imaging lens is represented by EFL, and EFL and ALT satisfy the inequality:

$EFL/ALT \geq 1.3$.

3. The optical imaging lens according to claim 2, wherein a central thickness of the fourth lens element is represented by T4, and T2 and T3 satisfy the inequality:

$(T3+T4)/G12 \geq 2.4$.

4. The optical imaging lens according to claim 1, wherein G12 and ALT satisfy the inequality:

$ALT/G12 \geq 3.6$.

5. The optical imaging lens according to claim 4, wherein an effective focal length of the optical imaging lens is represented by EFL, and EFL and ALT satisfy the inequality:

$EFL/ALT \geq 1.3$.

6. The optical imaging lens according to claim 1, wherein a central thickness of the second lens element is represented by T2, a central thickness of the fourth lens element is represented by T4, and T1, T2, T3 and T4 satisfy the inequality:

$(T3+T4)/(T1+T2) \leq 2.05$.

7. The optical imaging lens according to claim 1, wherein an air gap between the third lens element and the fourth lens element along the optical axis represented by G34, and G23, G34 and ALT satisfy the inequality:

$ALT/(G23+G34) \leq 12.45$.

8. The optical imaging lens according to claim 1, wherein an air gap between the third lens element and the fourth lens element along the optical axis represented by G34, and T3, G23 and G34 satisfy the inequality:

$T3/(G23+G34) \leq 7.4$.

9. The optical imaging lens according to claim 1, wherein a central thickness of the second lens element is represented by T2, a central thickness of the fourth lens element is represented by T4, and T2 and T4 satisfy the inequality:

$T4/T2 \leq 1.35$.

10. The optical imaging lens according to claim 1, wherein an abbe number of the fourth lens element is represented by v4, and v1 and v4 satisfy the inequality:

$0.95 \leq v1/v4 \leq 1.05$.

11. An optical imaging lens, sequentially from an object side to an image side along an optical axis, comprising a first lens element, an aperture stop, and second, third and fourth lens elements, each of the first, second, third and fourth lens elements having an object-side surface facing toward the object side and an image-side surface facing toward the image side, wherein:
the first lens element has a positive refractive index;
the second lens element has a refractive index, and the image-side surface thereof comprises a convex portion in a vicinity of a periphery of the second lens element;
the third lens element has a positive refractive index, and the object-side surface thereof comprises a concave portion in a vicinity of the optical axis;
the fourth lens element has a refractive index, and the image-side surface thereof comprises a concave portion in a vicinity of the optical axis I and a convex portion in a vicinity of a periphery of the fourth lens element;
the optical imaging lens comprises no other lenses having refractive index beyond the four lens elements; and
an abbe number of the first lens element is represented by v1, an abbe number of the second lens element is represented by v2, a central thickness of the first lens element is represented by T1, a central thickness of the third lens element is represented by T3, an air gap between the first lens element and the second lens element along the optical axis represented by G12, an air gap between the second lens element and the third lens element along the optical axis represented by G23, a sum of all three air gaps from the first lens element to the fourth lens element along the optical axis represented by Gaa, and v1, v2, T1, T3, G12, G23 and Gaa satisfy the inequalities:

$|v1-v2| \geq 25$, $(G12+T3)/(T1+G23) \geq 2.25$, and $T3/Gaa \geq 1.2$.

12. The optical imaging lens according to claim 11, wherein a sum of the central thicknesses of all four lens elements is represented by ALT, an effective focal length of the optical imaging lens is represented by EFL, and ALT and EFL satisfy the inequality:

$EFL/ALT \geq 1.3$.

13. The optical imaging lens according to claim 12, wherein a central thickness of the fourth lens element is represented by T4, and T3, T4 and G12 satisfy the inequality:

$(T3+T4)/G12 \geq 2.4$.

14. The optical imaging lens according to claim 11, wherein an air gap between the third lens element and the fourth lens element along the optical axis represented by G34, and T1, G23 and G34 satisfy the inequality:

$T1/(G23+G34) \leq 2.7$.

15. The optical imaging lens according to claim 14, wherein a central thickness of the fourth lens element is represented by T4, and T4 and G12 satisfy the inequality:

$G12/T4 \leq 1.55$.

16. The optical imaging lens according to claim 11, wherein a central thickness of the second lens element is represented by T2, a central thickness of the fourth lens element is represented by T4, and T1, T2, T3 and T4 satisfy the inequality:

$(T3+T4)/(T1+T2) \leq 2.05$.

17. The optical imaging lens according to claim 11, wherein an air gap between the third lens element and the fourth lens element along the optical axis represented by G34, and G23, G34 and ALT satisfy the inequality:

$ALT/(G23+G34) \leq 12.45$.

18. The optical imaging lens according to claim 11, wherein an air gap between the third lens element and the fourth lens element along the optical axis represented by G34, and T3, G23 and G34 satisfy the inequality:

$T3/(G23+G34) \leq 7.4$.

19. The optical imaging lens according to claim 11, wherein a central thickness of the second lens element is represented by T2, and T2 and G12 satisfy the inequality:

$G12/T2 \leq 2$.

20. The optical imaging lens according to claim 11, wherein an abbe number of the fourth lens element is represented by v4, and v1 and v4 satisfy the inequality:

$0.95 \leq v1/v2 \leq 1.05$.

* * * * *